Dec. 30, 1958 A. L. GATISS 2,866,361
HYDRO-KINETIC TRANSMISSION APPARATUS FOR VEHICLES
Filed Jan. 3, 1957 10 Sheets-Sheet 4

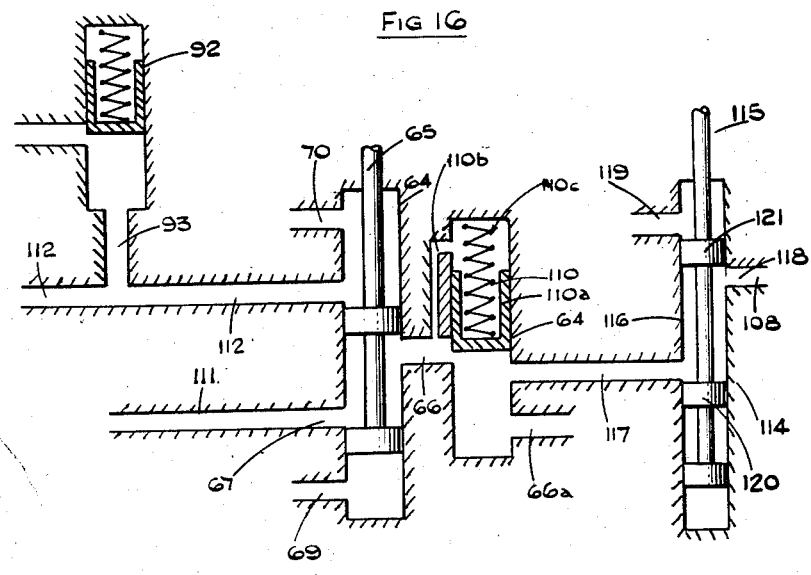

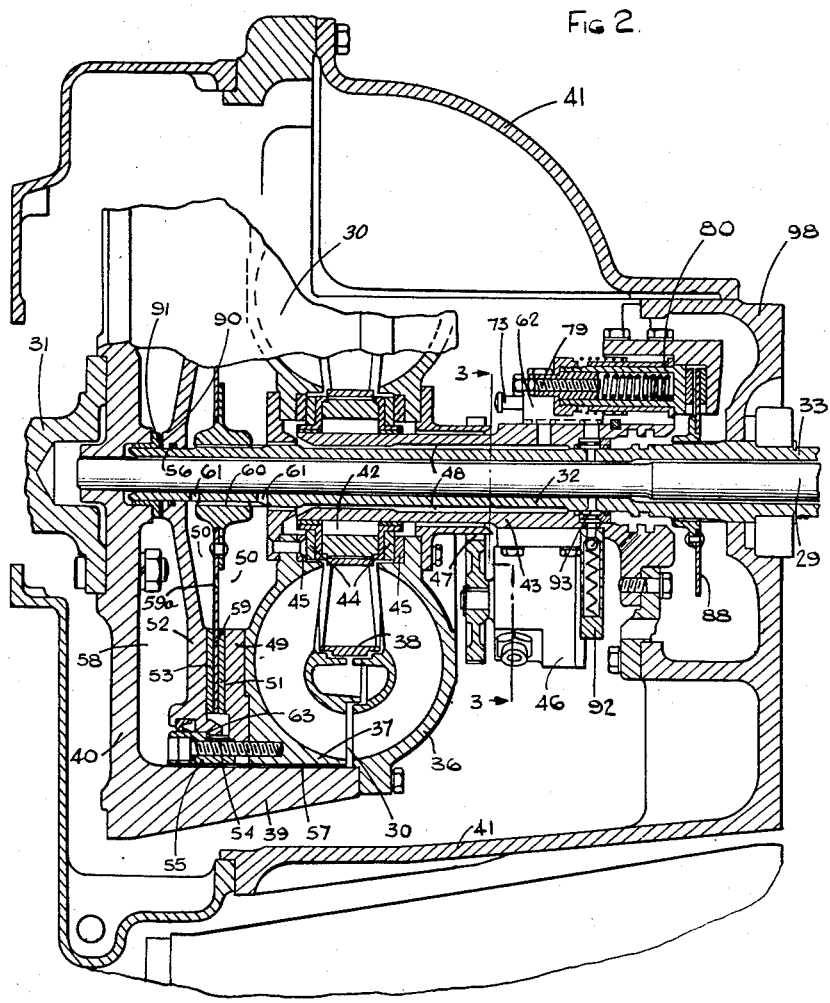

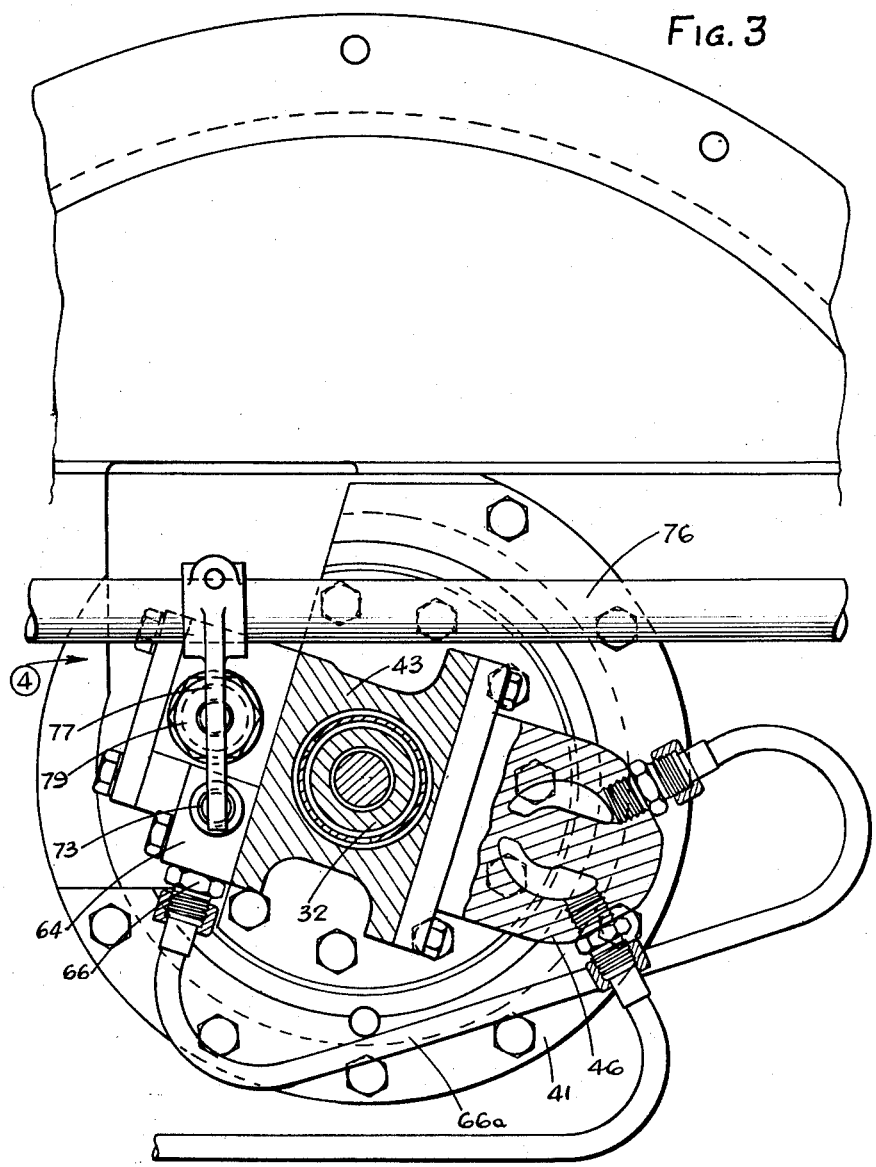

INVENTOR.
Albert Leslie Gatiss
BY
ATTORNEY.

Dec. 30, 1958 A. L. GATISS 2,866,361
HYDRO-KINETIC TRANSMISSION APPARATUS FOR VEHICLES
Filed Jan. 3, 1957 10 Sheets-Sheet 5
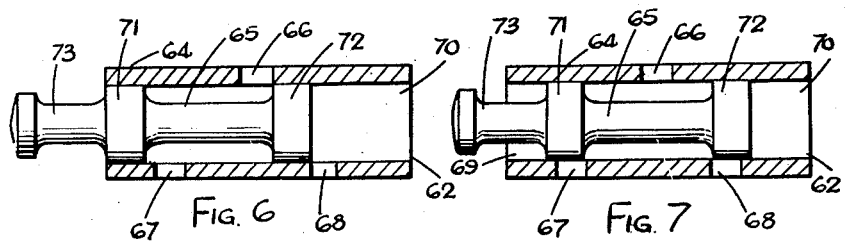
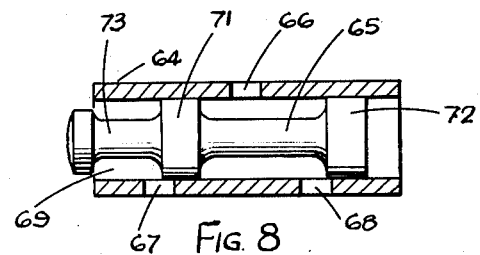
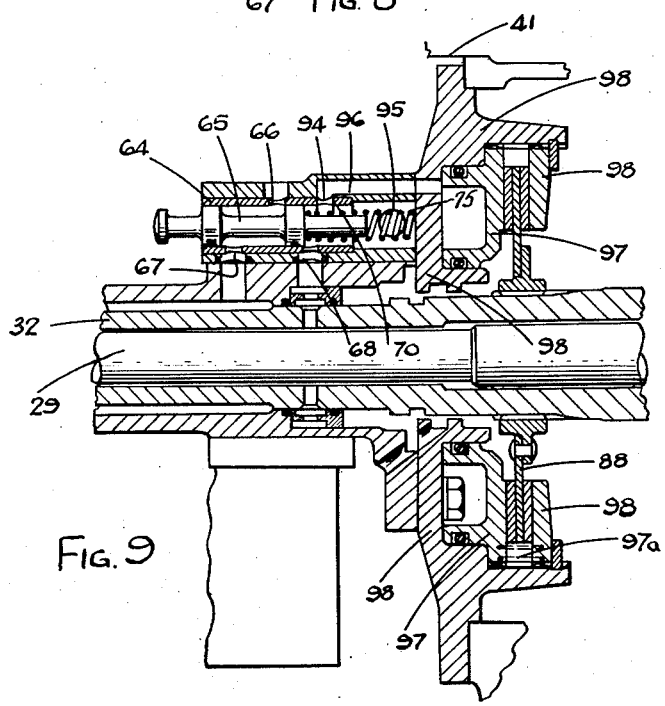
INVENTOR.
Albert Leslie Gatiss
BY A. John Michel
ATTORNEY.

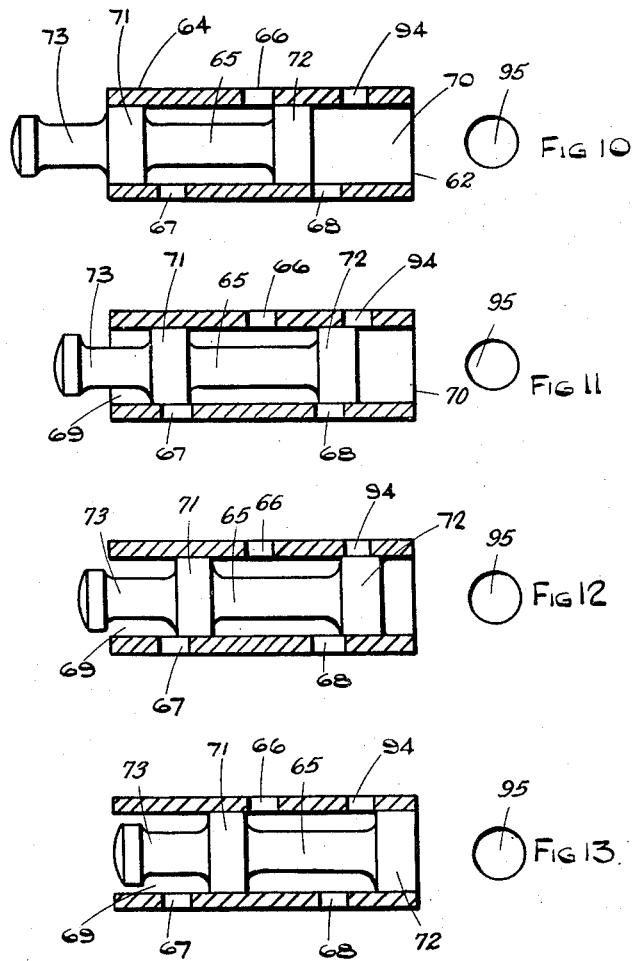

Dec. 30, 1958 A. L. GATISS 2,866,361
HYDRO-KINETIC TRANSMISSION APPARATUS FOR VEHICLES
Filed Jan. 3, 1957 10 Sheets-Sheet 7

INVENTOR.
Albert Leslie Gatiss
BY
ATTORNEY.

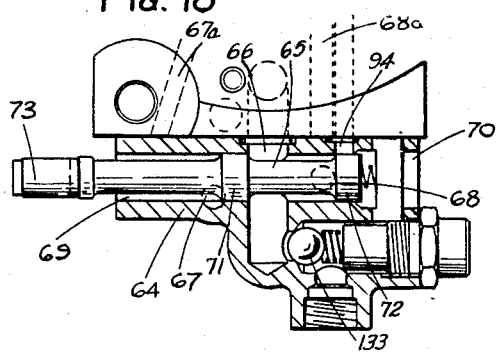
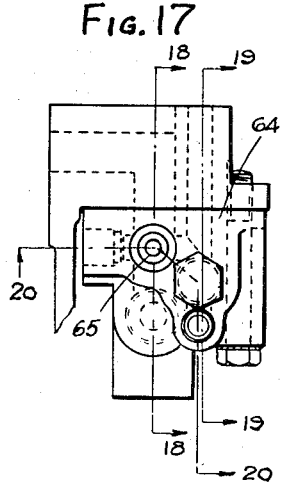
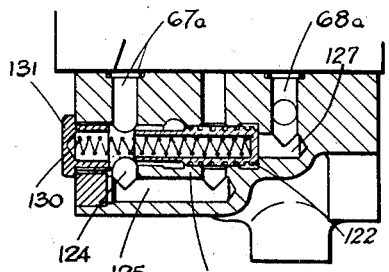
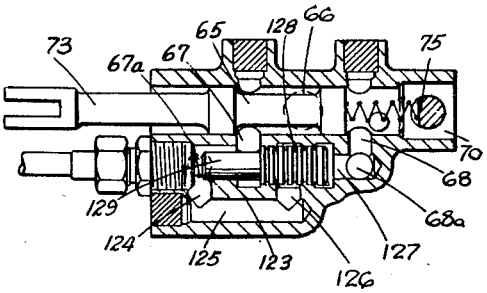
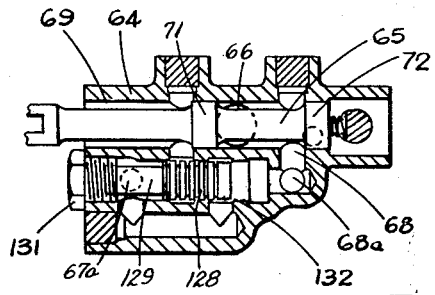

Dec. 30, 1958    A. L. GATISS    2,866,361
HYDRO-KINETIC TRANSMISSION APPARATUS FOR VEHICLES
Filed Jan. 3, 1957    10 Sheets-Sheet 9
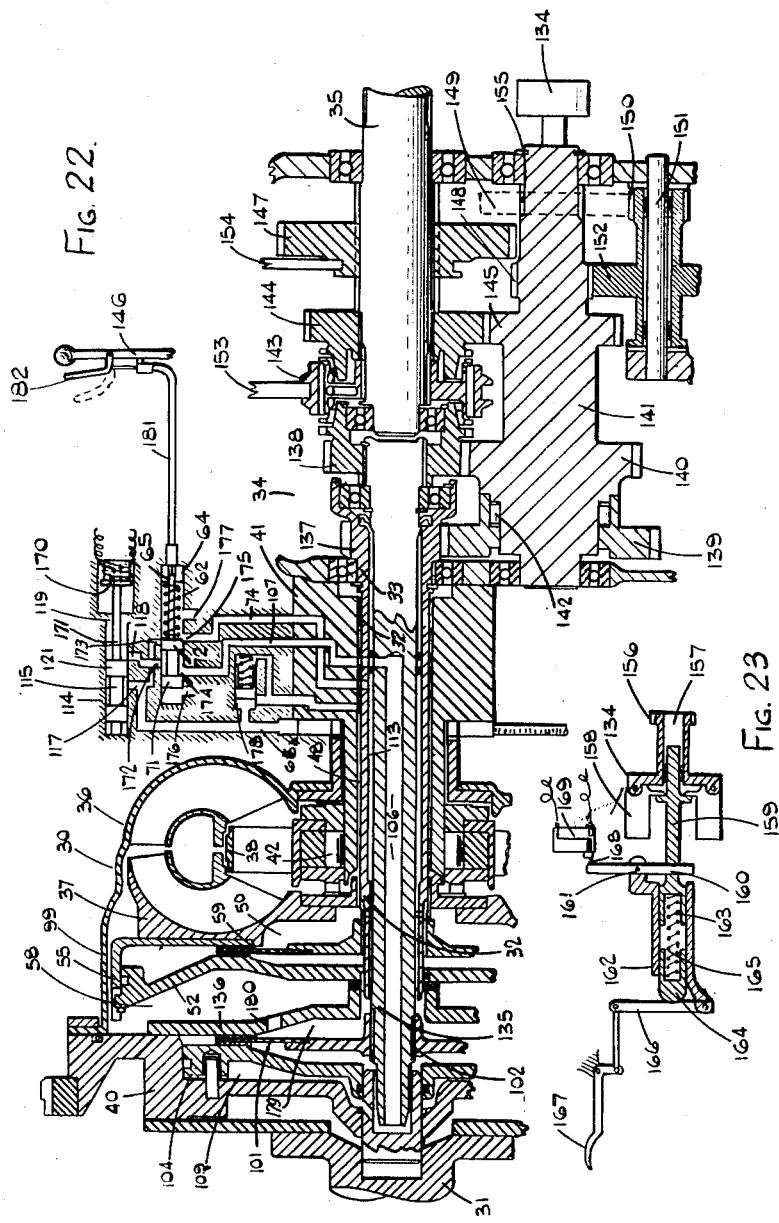
INVENTOR.
Albert Leslie Gatiss
BY
ATTORNEY.

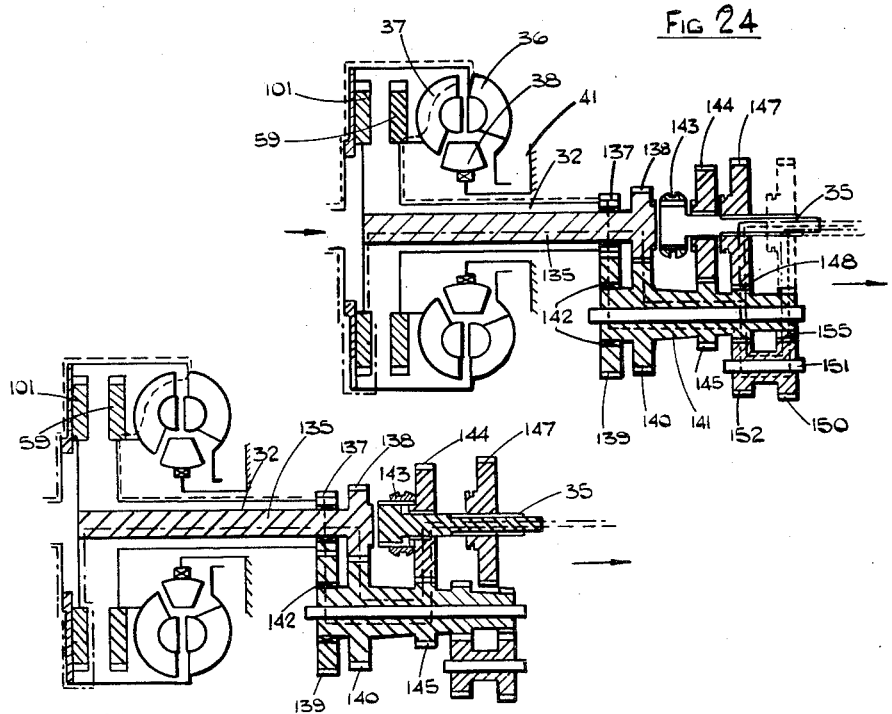
Fig 24
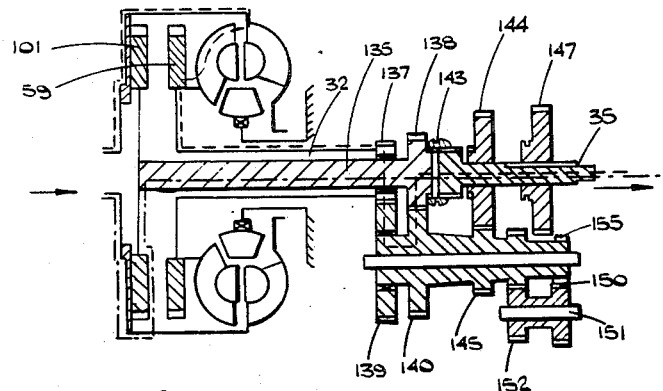
Fig 25
Fig 26

United States Patent Office 2,866,361
Patented Dec. 30, 1958

2,866,361

HYDRO-KINETIC TRANSMISSION APPARATUS FOR VEHICLES

Albert Leslie Gatiss, Southport, England, assignor to Brockhouse Engineering Limited, Southport, England, a British company Application January 3, 1957, Serial No. 632,329

Claims priority, application Great Britain January 6, 1956

20 Claims. (Cl. 74—732)

This invention relates to hydro-kinetic transmission apparatus for vehicles of the kind comprising impeller and turbine elements which provide a hydraulic circuit around which liquid, usually oil, is adapted to be circulated by the impeller element when this is power driven, and wherein the turbine element is intended to drive through the medium of a driven member, an output member of the vehicle and wherein it is required to provide a disconnectable drive between the turbine element and the output member. Hydro-kinetic transmission apparatus having the foregoing characteristics as set out in this paragraph is herein referred to as "transmission apparatus of the kind specified".

In such apparatus the hydraulic circuit may be constituted merely by impeller and turbine elements which provide a simple fluid coupling; alternatively and preferably, the hydraulic circuit would be constituted also by a reaction element which together with the impeller and turbine elements provide a torque converter.

One application of the invention is to vehicles in which the output member is required to perform some operation not directly connected with the advancement of the vehicle, for example, a digging operation in the case of digging vehicles and wherein by reason of the mass of the movable digging implements or the like it is required to provide a disconnectable clutch in the drive thereto primarily for the purpose of facilitating the starting of the power unit.

However, the principal application of the invention as so far developed is in transmission apparatus for driving the vehicle along in which the drive to the output member which would be connected to the vehicle wheels in the case, for instance, of a road vehicle is taken through the medium of a change-speed gear box, to an output or driven pinion of which the said output member may be directly connected, and to the input member of which gear box the turbine element is adapted to be connected through a member driven from the turbine and herein referred to as the "driven member."

In transmission apparatus of the foregoing kind when assembled with the change speed gear box as above described, the driven member of the transmission apparatus may constitute also the input member of the gear box, or, alternatively these two members may be constructed separately from one another and may be drivingly connected together considering the transmission apparatus and gear box assembled together.

Transmission apparatus of the foregoing kind is well known in which the change speed gear box referred to, is of the planetary type so that gear changes can be effected without it being necessary to disconnect the turbine element from the input member of the gear box, and the primary object of the present invention is to provide transmission apparatus of the kind specified in which an improved arrangement of disconnectable drive clutch is provided between the turbine element and the said output member, which clutch by virtue of the present invention is arranged in a particularly compact manner thereby rendering the transmission apparatus eminently suitable for vehicles, wherein the space available for accommodating the whole of the transmission apparatus is generally somewhat limited.

A further object of the invention is to provide such disconnectable drive clutch in the drive from the turbine element to the output member in such a manner as to permit of the transmission apparatus being employed in those cases in which the drive to the output member is taken through a change speed gear box of a form such that it is necessary to disconnect the drive from the turbine element to the input member of the gear box for the purpose of effecting a gear change as, for instance, in a conventional lay shaft gear box.

With the foregoing object in view, according to the present invention the transmission apparatus has incorporated therein a clutch adapted to provide a disengageable drive between the turbine element and said output member, said clutch comprising driving and driven clutch elements operably associated with the turbine element and driven member, and adapted releasably to clutch the turbine element to the driven member, a displaceable clutch engaging piston, means for supplying the hydraulic liquid under pressure from said hydraulic circuit to one side of said piston to displace this in a direction for engaging the clutch, means for supplying hydraulic liquid under pressure to the opposite side of the piston to displace this in a direction to effect clutch disengagement, valve means for controlling the difference in hydraulic pressure between said two opposite sides of said piston, the arrangement being such that the clutch engaging pressure is obtained from the hydraulic pressure within the said hydraulic circuit.

For convenience in description the clutch which provides this disengageable drive will be referred to where necessary as a "gear change clutch" since that is one of its important applications as above referred to, although it should be understood that this expression "gear change clutch" is employed merely in a designatory as opposed to a limiting capacity in so far as it is within the scope of the invention in its widest form that the said output member need not be driven through the medium of a gear box such as a change speed gear box.

By utilizing the hydraulic pressure within the hydraulic circuit constituted by the impeller and turbine elements, a relatively simple arrangement of clutch is possible in which the clutch forms in this way an operative combination with the impeller and turbine elements of the transmission apparatus, and in particular there is no necessity to provide special means entirely separate from the hydraulic circuit aforementioned for supplying the hydraulic liquid under pressure to effect clutch engagement.

Preferably, the arrangement is such that any increase in hydraulic pressure within the hydraulic circuit of the transmission apparatus which occurs during the operation of the transmission apparatus is applied to the clutch engaging piston in such a manner as to increase the clutch engaging pressure and thereby increase the torque which can be transmitted by the clutch while this is engaged.

In practice this increase in hydraulic pressure arises from the centrifugal and kinetic forces acting on the rotating mass of hydraulic liquid as hereinafter more particularly explained.

A further object of the invention is to provide transmission apparatus of the kind specified in which the turbine element is capable of limited movement in an axial direction, the arrangement being such that the turbine element moves axially to displace the clutch engaging piston against a thrust face in such a manner as to still further increase the clutch engaging pressure under operative conditions.

A further object of the invention is to provide transmission apparatus of the kind specified embodying a clutch as above described including a driven clutch element in the form of a disc of relatively light construction frictionally clamped in its engaged position between the piston and the turbine element so as to ensure that the inertia of the rotating parts associated with the gear box is maintained at a minimum considering the clutch disengaged.

The realization of such an object enables in certain instances of the customary clutch stop to be dispensed with.

A further object of the invention is to permit in the alternative of a stop of mechanical form to be provided controlled by the operation of the said valve means for effecting the disengagement of the clutch.

Alternatively a further object of the present invention is to provide a clutch stop, the opeartion of which is controlled hydraulically under the over-riding control of said valve means whereby only the minimum of manual effort on the part of the operator is needed to effect both clutch disengagement and also the engagement of the clutch stop, namely, by the operation of said valve means.

A further object of the invention is to provide a transmission apparatus of the kind specified in which the clutch provided as above described is incorporated in the apparatus in such a manner as to modify the design of the apparatus to the minimum possible extent.

Still another object of the present invention is to incorporate in transmission apparatus of the foregoing kind a second clutch in addition to the clutch already described so as to provide a direct 1:1 drive from the vehicle engine to the input member of the gear box without any of the power passing through the hydraulic circuit.

Still another object of the present invention is to apply transmission apparatus of the foregoing kind incorporating a gear shift clutch as above described to such apparatus which incorporates also torque and/or speed responsive means for automatically bringing the power transmitting hydraulic circuit into and out of operation, for example, in the general manner described in the prior United States patent specification No. 2,588,220.

Other objects of the present invention will be apparent from the following description and the appended claims.

Referring now to the accompanying drawings:

Figure 1 is a part sectional side elevation of one form of hydro-kinetic transmission apparatus intended for use on motor road vehicles which apparatus embodies the present invention and is arranged in combination with a conventional lay shaft gear-box.

Figure 2 is a cross-sectional side elevation to an enlarged scale of part of the hydro-kinetic transmission apparatus depicted in Figure 1, certain parts being omitted for clarity.

Figure 3 is a cross-sectional view on the line 3—3 of Figure 2.

Figures 6, 7 and 8 are diagrammatic part-sectional views illustrating the mode of operation of the valve member of the valve means partly depicted in Figure 5.

Figure 9 is a view similar to Figure 5 illustrating a modification.

Figures 10, 11, 12 and 13 are part-sectional diagrammatic views depicting the operation of the valve means depicted in Figure 9.

Figure 16 is a diagrammatic view illustrating the arrangement of the clutch control apparatus depicted in part in Figure 15.

Figure 17 is an end view of a valve casing of a further arrangement of clutch control valve means for transmission apparatus in accordance with the present invention.

Figure 5:
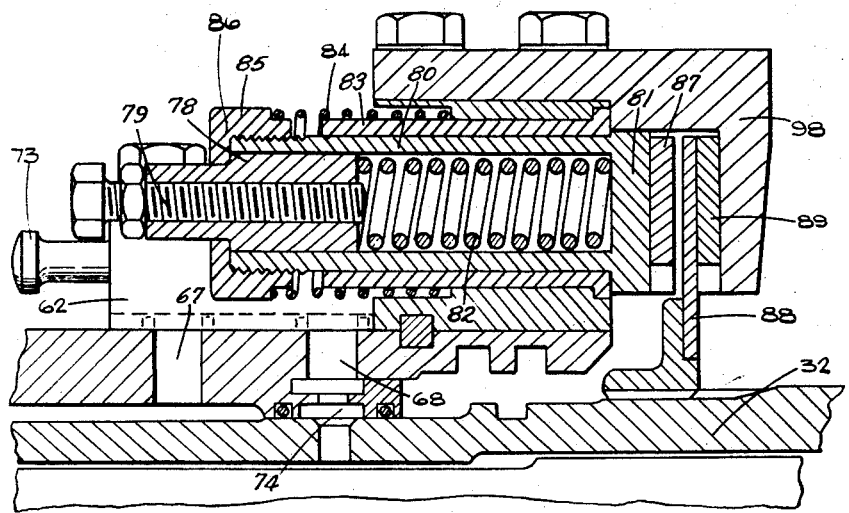
Figure 5 is an enlarged cross-sectional view of part of the construction depicted in Figure 2 illustrating certain details of the valve means for controlling the operation of the clutch.

Figures 18 and 19 are cross sectional views on the lines 18—18 and 19—19 respectively of Figure 17.

Figure 20 is a cross-sectional view on the line 20—20 of Figure 17 depicting the parts in the clutch engaged position.

Figure 21 is a view similar to Figure 20 depicting the parts in the clutch disengaged position.

Figure 22 is a cross-sectional side elevation of part of a further form of vehicle transmission apparatus incorporating a lay-shaft gear box and embodying the present invention, the gear box being depicted in the neutral position.

Figure 23 is a detailed view illustrating a further part of the construction generally depicted in Figure 22.

Figures 24, 25 and 26 are diagrammatic cross-sectional views of the construction depicted in Figure 22 illustrating the parts respectively in the low gear and reverse drive, intermediate gear and high gear positions.

Referring firstly to the construction depicted in Figures 1 to 8 of the drawings and considering particularly in the first place Figures 1 and 2, the hydro-kinetic transmission apparatus for a motor road vehicle there depicted comprises a hydro-kinetic torque converter 30 arranged between driving member 31 which is connected to the motor vehicle engine in the usual way, and driven member 32, both of which members are formed as aligned shafts, which driven shaft 32 herein referred to as the turbine shaft is connected to the input member 33 of a conventional lay shaft gear box designated generally at 34 in Figure 1 and having an output member 35 from which the power is transmitted to the vehicle wheels in the usual way.

The torque converter 30 is of generally known form comprising vaned impeller, turbine, and reaction elements, 36, 37, 38, respectively. The impeller element is connected to the annular rim 39 of engine fly-wheel 40 on driving shaft 31 which rim serves to enclose the driven turbine element 37 of the torque converter. The whole of the torque converter is enclosed within an outer stationary casing 41 the interior of which serves as a low pressure reservoir for the hydraulic liquid namely oil which is circulated in the known manner under pressure by the impeller element around the hydraulic circuit constituted by the vaned impeller, turbine, and reaction elements of the torque converter.

The reaction element 38 is supported for unidirectional rotation in the known manner through one way brake 42, from one end of stationary reaction element sleeve 43, the opposite end of which is anchored to the stationary casing 41, which sleeve 43 extends around the turbine shaft 32.

The impeller and turbine elements 36, 37 are at a position adjacent the reaction element sleeve 43 supported for rotational movement in a manner conventional in torque converters. In association with the support for the reaction element 38 from sleeve 43 is a pair of axially spaced oppositely directed locating members 44 of annular form adapted to engage with adjacent opposed annular locating members 45 mounted one on the impeller element and the other on the turbine element, the arrangement being such that the turbine element can move axially in a lefthand direction in Figure 2 away from the impeller element towards the fly-wheel 40 through a distance which is limited as hereinafter described. Such axial movement occurs under the hydraulic pressure obtaining within the interior of the torque converter, under which conditions there is ample clearance between these locating members 44, 45 for the feeding of oil into the interior of the torque converter, which oil can in fact at all times flow past opposed faces of these locating members.

The oil is fed under pressure into the interior of the torque converter by pump 46 which receives its oil from the interior of casing 41, the pump being driven through gearing 47 from the impeller element, and the oil is fed to the torque converter from this pump through the medium of one or more axially extending passages 48 between the reaction element sleeve 43 and the turbine shaft 32 therewithin which oil passes through passages (not illustrated) in the reaction element sleeve 43 and around the end of the latter to and between the pairs of locating members 44, 45 aforesaid into the interior of the torque converter.

The turbine element 37 on the outer face thereof which is directed away from the impeller element 36 i. e. towards the engine fly-wheel 40 is provided with an annular driving clutch element 49 mounted rigidly thereon of bore substantially greater than the diameter of the turbine shaft so as to provide at its inner end an oil receiving space 50 adapted to receive high pressure oil for clutch disengaging purposes.

Disposed between the turbine clutch element 49 and the fly-wheel 40 is a disc-like clutch engaging piston 52 axially slidably splined at its periphery namely at 54 to an outer annular clutch element rim 55 connected rigidly to the turbine clutch element 49 and turbine element 36. Since the piston is splined to rim 55 it rotates with the turbine element 36. The radially inner end of this piston 52 is supported freely at 56 from the exterior of the adjacent end of the turbine shaft 32 so that the piston can freely slide along this shaft 32 during its clutch engaging and disengaging movement.

Clearance is provided at 57 between the adjacent fly-wheel rim 39 and the periphery of this clutch element rim 55 as well as between the fly-wheel rim 39 and the periphery of the turbine element 37 with clearance also between the outer edge of the latter and the adjacent edge of the impeller element 36 so that the high pressure oil fed from the pump to the interior of the torque converter can pass around the periphery of the turbine clutch element rim into a high pressure oil space 58 between the engine fly-wheel and the adjacent outer end face of the said clutch engaging piston.

The other or driven element of the clutch comprises an annular clutch disc 59 which extends between the clutch element 49 and piston 52 and provided on its opposite sides with clutch facings 51, 53 adapted for clutch engagement with the turbine clutch element 49 and piston 52 respectively, and this disc 59 is slidably splined at its inner end namely at 60 onto the adjacent exterior of the turbine shaft 32.

The arrangement is accordingly such that when high pressure oil is fed from the pump 46 to the torque converter 30 and thence to the high pressure oil space 58 between the fly-wheel 40 and the clutch engaging piston 52, the latter is slidden axially so as to engage the clutch disc with the turbine clutch element 49 and accordingly connect the turbine element 37 to the turbine shaft 32: the drive being transmitted to the clutch disc 59 from both clutch element 49 and piston 52.

The inner portion of the annular clutch disc 59 extends through the clutch disengaging oil receiving space 50, which oil receiving space 50 is connected through radial passages 61 in the turbine shaft 32 to the hollow interior of this shaft adapted under the control of clutch operating valve means indicated generally at 62 in Figure 2 to be connected to the high pressure oil supply pump 46 aforesaid, so as thereby to supply oil under pressure to the said space 50 to effect clutch disengagement; which valve means 62 as hereinafter more particularly explained is adapted at the same time to connect the interior of the torque converter including the high pressure oil space 58 on the outer side of the clutch engaging piston to the interior of the casing 41 which is at atmospheric pressure, the arrangement being such that the clutch piston 52 is then slidden in a direction towards the fly-wheel to disengage the clutch; which clutch piston disengaging movement is finally restricted by interengageable stop faces 63 provided between the peripheral piston splines 54 and the turbine clutch element rim 55. This clutch disengaging movement is facilitated by the provision of holes 59a through the clutch disc 59 so that both sections of space 50 on opposite sides of the clutch disc are in direct communication with one another.

Clutch engagement is effected as hereinafter described by a reverse operation of said valve means 62 by which the high pressure is fed through passages 48 to the interior of the torque converter and thence through peripheral clearance space 57 to oil space 58 to apply pressure to piston 52 simultaneously with the connection through valve means 62 of oil space 50 to the interior of casing 51.

As shown more particularly in Figures 4 to 8 the clutch operating valve means 62 has incorporated with it a mechanically operated clutch stop and comprises a valve housing 64 disposed within casing 41; in which valve housing is axially slidable a clutch operating valve member 65, which housing 64 is provided (see Figure 4) with five ports, namely, a high pressure inlet port 66 connected by pipe 66a (see Figure 3) to the output side of the pump 46, and arranged centrally of the length of the housing; axially spaced high pressure clutch engaging and clutch disengaging ports 67, 68 respectively and disposed on opposite axial sides of the high pressure inlet port 66, the remaining two ports being low pressure ports 69, 70 provided by opposite ends of the valve member housing 64, which housing is of tubular form.

The arrangement of these five ports is shown also in Figures 6 to 8 which depict diagrammatically the operation of the valve means 62.

Figure 4:
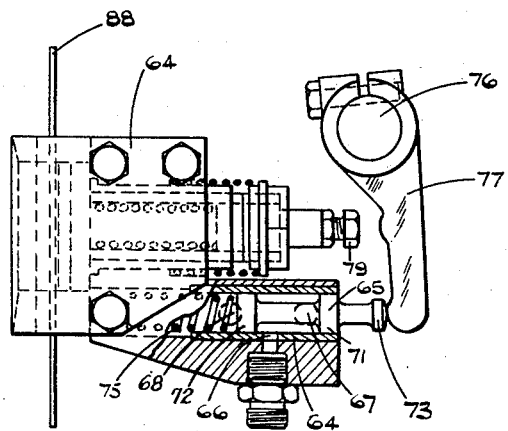
Figure 4 is a part-sectional side elevation looking in the direction of the arrow 4 of part of the construction depicted in Figure 3.

The valve member 65 is provided with two axially spaced piston portions 71, 72 so as to provide therebetween an annular space which is in communication with the high pressure inlet port 66; the arrangement being such that in one axial position of the valve member, namely, a clutch engaged position depicted in Figures 4, 5, 6 in which an operating stem 73 on the valve member projects beyond the housing towards the adjacent impeller element 36, the inlet port 66 is connected as best shown in Figure 6 to the clutch engaging port 67, and from the latter through the passage 48 to the interior of the torque converter and thence through clearance 57 to the space 58 on the outer side of the clutch engaging piston 52 to maintain this in the clutch engaged position.

In this clutch engaged position depicted in Figure 6, of the valve member 65, the clutch disengaging port 68 is connected to the low pressure port 70 formed by the adjacent end of the tubular valve housing i. e. to the interior of the casing 41 which is at atmospheric pressure and as this clutch engaging port 67 is connected through radial passage 74 (see Figure 5) to the interior of turbine shaft 32 and thence through passage 61 to space 50 the latter will also be at atmospheric pressure adjacent the turbine shaft 32.

When the stem 73 of the valve member 65 is depressed so as to slide the valve member in a direction away from the impeller element i. e. to the right in Figures 4 to 6 the two piston portions 71, 72 are first brought into the intermediate position depicted in Figure 7 in which clutch disengaging port 68 is partially uncovered by piston portion 72 so as to commence the admission of oil under pressure through this port to the clutch disengaging receiving space 50 before piston portion 71 has fully closed the clutch engaging port 67.

Such mode of operation of the clutch operating valve which ensures that high pressure oil is supplied to the clutch disengaging space 50 before pressure within the interior of the torque converter and oil receiving space 58 is relieved leads to smooth control of clutch disengagement as well as smooth control clutch engagement during the reverse movement of the valve member 65 wherein as will be appreciated from Figure 7 the high pressure oil will be re-admitted to the interior of the torque converter and thence to space 58 before clutch disengaging port 68 has been connected to low pressure port 70 to effect release of the oil pressure within space 50.

As the valve member 65 is further displaced to the right it finally moves into the clutch disengaged position depicted in Figure 8 in which port 68 is now fully opened to admit full oil pressure to space 50 and at the same time clutch engaging port 67 is completely cut off from the inlet port 66 and is now in communication past stem 73 with the adjacent low pressure port 69 so as to permit of discharge of the high pressure oil from space 58 on the outer side of clutch piston 52.

Thus clutch piston 52 is now subject to the pressure of the high pressure oil in the adjacent space 50 between it and the clutch disc 59 fed to this space through the adjacent passage 61 so that piston 52 is now slidden to the left in Figure 2 to relieve its pressure on clutch disc 59 which accordingly, is no longer in pressure engagement with the turbine clutch element 49 and the clutch is now disengaged.

The valve member 65 is as will be appreciated from the drawings of the balanced type in that the opposed faces of its piston portions 71 and 72 are subject to high pressure from port 66 whereby this valve member can be displaced in a particularly easy manner.

The return movement of the valve member 65 on release of stem 73 is effected by a helical compression spring 75 (see Figure 4) and its operative movement to effect clutch disengagement is obtained mechanically in this particular arrangement from a clutch operating shaft 76 connected to the usual clutch pedal (not illustrated), the shaft extending within the interior of the casing from which it is pivotally mounted and carrying an arm 77, the outer end of which engages with the outer end of the valve member stem 73 so as to depress this to effect clutch disengagement when the clutch pedal is depressed.

Engagement of the clutch is effected by a reverse movement of the valve member 65 from that above described so that the valve member moves from the position depicted in Figure 8 through the intermediate position shown in Figure 7 into the clutch engaged position shown in Figure 6 so as first to re-admit oil under high pressure to the torque converter and subsequently relieve the oil pressure within the clutch disengaging space 50 as the valve member moves from the position depicted in Figure 7 to that shown in Figure 6.

Arranged between this clutch operating shaft 76 and the clutch operating valve member 65 is a clutch stop engaging plunger 78, the outer end of which plunger is provided with a stem 79 adapted to be first engaged by the medial portion of the said arm 77 after the latter has moved into the clutch disengaging position.

The inner end of this plunger 78 is as best shown in Figure 5 axially slidable in a direction parallel to that of the valve member 65 within one end of an axially slidable clutch stop sleeve 80, the opposite end 81 of which is closed; with a compression spring 82 disposed between such closed end and the inner end face of the plunger 78, which compression spring 82 serves to prevent the clutch operating mechanism being unduly stressed in the event of the operator pressing the clutch pedal down too hard beyond the normal clutch disengaging position.

This sleeve 80 is itself axially slidable within a sleeve housing 83, surrounding which housing is a relatively light return spring 84 acting between a shouldered part on the housing and one end of a collar 85 mounted on sleeve 80 to slide therewith, the opposite end of which collar is flanged at 86, said flange 86 being adapted to engage with an outwardly directed shoulder on the sliding plunger 78.

The closed end 81 of the slidable sleeve 80 carries a friction lining 87 adapted to engage with one side of a clutch stop disc 88 slidably splined to the adjacent exterior of the turbine shaft 32, the opposite side of which disc 88 is adapted to engage with a second friction lining 89 carried by an adjacent stationary part 98 of the said casing 41 and which adjacent part serves also to support the valve housing 64 in which the clutch stop plunger 78 and its associated parts is also disposed.

The arrangement is such that under the control of the outer light return spring 84 aforesaid, normally the friction lining 87 on the slidable sleeve 80 is clear of the clutch stop disc 88 so that the turbine shaft 32 is free, but in the event of the clutch pedal being depressed beyond the distance necessary to effect full clutch disengaging movement of the valve member 65, the clutch operating arm 77 engages with the stem 79 of the slidable plunger 78 to depress this and thus through the inner spring 82 displace the slidable sleeve 80 in a direction for gripping the clutch stop disc 88 between the two friction linings 87, 89 so as rapidly to arrest the rotation of the already disengaged turbine shaft 32 in the known manner.

Such clutch stop would only be needed where the torque to be transmitted through the transmission apparatus is relatively heavy, since with the above described design of clutch it will be appreciated that the only part of the clutch which is connected to the turbine shaft 32 is the relatively light clutch disc 88 i. e. the inertia of the rotating parts connected to the input side of the gear box is reduced as far as possible with this particular design.

The clutch engaging piston 52 is provided adjacent the turbine shaft 32 with a thrust face 90 which is capable of thrust engagement with thrust face 91 provided on the adjacent inner side of the central boss of the fly-wheel 40, thrust engagement between piston face 90 and fly-wheel face 91 occurring as hereinafter described after the clutch is engaged under the hydraulic pressure developed under operative conditions within the torque converter during which the turbine element moves axially away from the impeller element in a left-hand direction in Figure 2 so as, as hereinafter explained to cause thrust face 90 to engage thrust face 91 and take up the illustrated clearance therebetween, which clearance permits of the piston 52 moving away from clutch disc 59 into its disengaged position when the pressure within the interior of the torque converter and space 58 is relieved.

As will be apparent from the foregoing description, the clutch engaging pressure is derived from the hydraulic pressure within the hydraulic circuit formed by the three elements of the torque converter 30 and it accordingly follows at any increase in the hydraulic pressure within the torque converter will produce automatically a corresponding increase in the hydraulic pressure within the high pressure oil space 58 so as thereby to increase automatically the pressure on the clutch engaging piston 52 and thus the clutch engaging pressure at the clutch itself.

The hydraulic pressure within the torque converter is derived partly from the pressure at which the oil is delivered thereto from pump 46, but under operative conditions, more particularly when the oil is being supplied to the torque converter under full pressure from the pump, i. e. when the valve member 65 is in the clutch engaged position and the impeller element, is rotating at any appreciable speed, the oil within the interior of the torque converter is subjected to centrifugal force, thereby increasing substantially the hydraulic pressure within the torque converter, and similarly under the same conditions there is an increase in the pressure of the oil within space 58 under the effect of centrifugal force thereon.

Further, during the operation of the torque converter, the turbine element 37 is subject to hydraulic pressure arising from the kinetic forces on the oil within the torque converter, which hydraulic pressure tends to displace the turbine element in an axial direction away from the impeller element, i. e. in a lefthand direction in Figure 2, and in practice the displacing pressure would be such as to displace the axially slidable driven clutch disc 59 together with piston 52 until thrust face 90 thereon engages with thrust face 91 associated with the engine fly-wheel 40. Since the fly-wheel 40 is rigidly connected to the impeller element 36, under these conditions the whole of this thrust reaction arising from this increase of pressure within the torque converter will be taken through these interengaging thrust faces 90 and 91 and must be transmitted thereto through the facings 51, 53 on driven clutch disc 59, thereby still further increasing the clutch engaging pressure applied to disc 59 under operative conditions when the maximum hydraulic pressure is being developed within the interior of the torque converter.

Thus the above described construction ensures that when under operative conditions the pressure loading within the interior of the torque converter is at a maximum the clutch is capable of transmitting the maximum torque to the turbine shaft 32 without slip.

In fact, the provision of these interengaging thrust faces 90 and 91 functioning in the manner above described enables the clutch to transmit a particularly high torque without slip, without at the same time it being necessary to employ an undesirably high oil pressure within the hydraulic circuit for the purpose merely of ensuring full clutch engagement.

Thus the design is such that as heavy drive loads are imposed upon the turbine shaft, the clutch engagement is assisted by both centrifugal pressures and by longitudinal thrust on the turbine element both derived from the hydraulic liquid. These two factors in addition to permitting of a lower maximum pump pressure as above explained, also assist in producing smooth clutch engagement.

As will be apparent from the foregoing the pressure within the clutch disengaging oil space 50 required to effect clutch disengagement is in practice substantially less than that required to maintain the clutch in full engagement without slip under maximum torque transmitting conditions and it is in any event desirable to avoid employing too high a clutch disengaging pressure within oil space 50 as under clutch disengaging conditions in which the clutch piston 52 is out of contact with clutch face 53 it is supported adjacent its outermost periphery only at thrust face 63, so that piston 52 would be liable to distort in an axial direction towards the fly-wheel 40 unless made of an undesirably heavy section.

The necessity for making the piston 52 of this undesirably heavy section is avoided by limiting the clutch disengaging pressure within space 50 to a relatively low value substantially below the maximum clutch engaging pressure by providing a pressure relieving valve 92 of conventional form and embodying a spring loaded valve member, which relieving valve is in communication through passage 93 (see Figure 2) with the interior of turbine shaft 32 through which the clutch disengaging oil pressure is supplied to space 50, and this relieving valve would be arranged in the known manner to relieve the excess oil pressure from the valve 92 into the interior of casing 41 within which the valve 92 is disposed.

For instance, assuming a delivery pressure from the pump 46 of 75 lbs. per square inch, under which pressure the oil would be fed to the interior of the torque converter along passages 48, the pressure relieving valve may be set to effect pressure release at approximately 30 lbs. per square inch, thus maintaining a maximum pressure within clutch disengaging space 50 considerably below that obtaining within the torque converter and space 58 when the clutch is engaged.

Disposed within the interior of the hollow turbine shaft is a central shaft 29 which is associated with an auxiliary pump drive forming no part of this invention and which accordingly will not be described.

With the above described arrangement it will be appreciated that engagement and disengagement of the gear change clutch is effected solely by the pressure of the oil. Such an arrangement lends itself to hydraulic as opposed to the above described mechanical operation of the clutch stop in which the spring loaded plunger and sliding sleeve for operating the clutch stop as shown in Figures 3 to 5 would be dispensed with and the modified arrangement depicted in Figure 9 employed instead.

Referring now to this modified arrangement shown in Figure 9 and diagrammatically in Figures 10 to 13, the housing 64 of the clutch operating valve member 65 is provided with a further port 94 constituting a clutch stop port arranged in the wall of the housing 64 between the clutch disengaging port 68 and the adjacent end of the housing, the arrangement being such that this clutch stop port 94 is in communication with the adjacent end of the housing i. e. through low pressure port 70 and adjacent low pressure outlet 95 with the interior of the casing 41 when the valve member 65 is in its clutch engaging position depicted in Figure 9 and diagrammatically in Figure 10, as well as when the valve member 65 moves into the intermediate position depicted in Figure 11 in which as earlier described in connection with Figure 7 the high pressure oil is fed to clutch disengaging space 50 before its supply to the torque converter is finally cut off.

The arrangement is further such that as the valve member 65 moves into the clutch disengaged position depicted in Figure 12, the clutch stop port 94 is now completely closed by the adjacent valve member piston portion 72. On further displacement of the valve member 65 by the driver beyond this clutch disengaged position, the piston portion 72 moves beyond the clutch stop port 94 so as now to connect this to the high pressure inlet port 66 as the valve member moves into its final position depicted in Figure 13 in which clutch disengaging port 68 is still connected to the high pressure inlet port 66.

The high pressure oil now supplied to clutch stop port 94 is fed through axially directed passage 96 in valve housing 64 to the interior of a hollow annular clutch stop piston 97 which extends around the adjacent part of the turbine shaft 32 and is mounted for limited axial sliding movement within an annular recess in a ring-like stationary part 98 carried by the said casing and supporting both the valve member housing 64 and reaction element sleeve 43.

This piston 97 carries clutch facing 87 which engages with one side of clutch stop disc 88 as in the preceding arrangement and similarly slidably splined to the turbine shaft 32, the opposite side of which engages similarly with second clutch facing 89 mounting on the aforesaid stationary part 98, the arrangement being such that when the clutch operating valve member 65 is fully depressed into the position depicted in Figure 13, the oil is admitted under pressure from inlet port 66 through port 94 and passage 96 to the interior of the clutch stop piston 97 to effect engagement of the clutch stop disc 88, while on the valve member being released it is displaced to the left in Figures 9 to 13 under the loading of the aforesaid spring 75 and the clutch stop port 94 is again placed into communication with the interior of the casing 41 to relieve the pressure on the clutch stop piston 97 which moves away from clutch stop disc 88 under the loading of return springs 97a of which a number are provided between piston 97 and stationary part 98 at intervals around the periphery of disc 88, thereby ensuring effective disengagement of the clutch stop disc.

Figure 14:
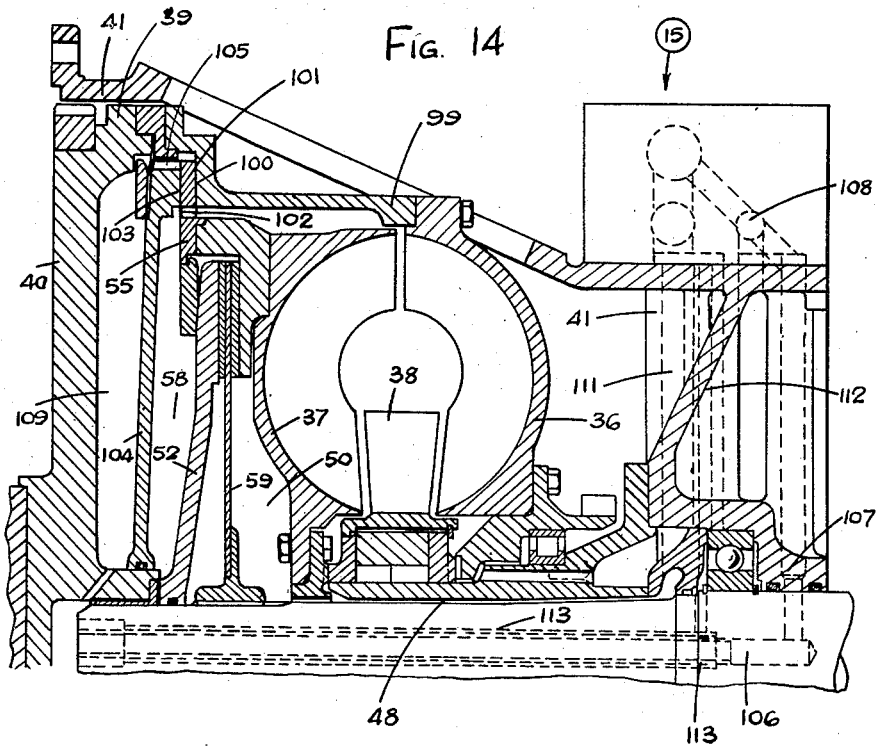
Figure 14 is a cross-sectional side elevation of the upper half of a further form of transmission apparatus embodying the present invention.
Figure 15:
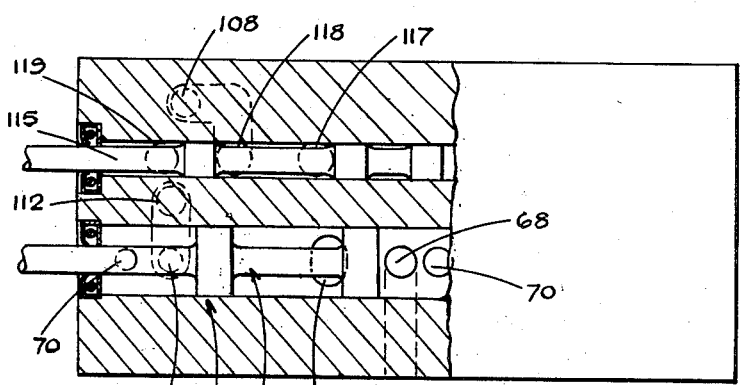
Figure 15 is a sectional plan view to an enlarged scale of part of the apparatus depicted in Figure 14, looking in the direction of arrow 15 in Figure 14.

In the case where a direct 1:1 drive clutch is provided between the engine and the gear box for the purpose of transmitting a direct 1:1 drive from the engine to the input member 33 of the gear box 34 without any part of this drive passing through the hydraulic circuit of the torque converter, the construction above described would be modified as shown in Figures 14 to 16 by providing a 1:1 direct drive clutch arranged between the turbine shaft 32 itself connected to the input member 33 of the gear box and the engine, such as the impeller element 36 which is rotated at engine speed.

In such an arrangement as shown in Figure 14, the impeller element 36 is driven from the engine fly-wheel 40 through the medium of a shell-like element 99 having adjacent its connection to the fly-wheel rim a radially disposed direct drive clutch face 100 adapted for engagement with an annular direct drive clutch element 101 the interior of which is slidably splined at 102 to the periphery of the turbine clutch element rim 55 of the gear change clutch and which is mounted on the turbine element 37 to rotate therewith as in the construction already described depicted in Figure 2.

The end face 103 of this direct drive clutch element 101 opposite to the clutch face 100 of the impeller shell 99 is adapted to be engaged by the periphery of a disc-like direct drive clutch engaging piston 104 which is itself peripherally splined at 105 to the said impeller shell adjacent its connection to the engine fly-wheel 40, the arrangement being such that when this direct drive clutch piston 104 is displaced in a clutch engaging direction towards the turbine element 37, a direct drive is transmitted from the impeller driving shell 99 through the direct drive clutch element 101 and turbine clutch element rim 55 splined thereto at 105 to the turbine element 37 and from the latter through the gear change clutch disc 59 to the turbine shaft 32.

Under those conditions the whole of the power path is through two clutches aforementioned without any part of the power being transmitted through the torque converter so as to provide a direct 1:1 speed drive from the engine to the gear box.

In this latter arrangement valve means shown in Figures 15 and 16 and separate from the gear change clutch valve means is provided under the control of a separate operating member for effecting engagement of this 1:1 direct drive clutch which normally would be in the disengaged position.

For this purpose the turbine shaft 32 is provided with an axially extending central bore 106, one end of which through a radially extending port 107 communicating with a direct drive clutch engaging passage 108 provided in part of the housing 64 aforesaid, and the opposite end of this axially extending bore 106 communicates with a high pressure oil receiving space 108 provided between the interior of the fly-wheel 40 and the adjacent end face of the direct drive clutch engaging piston 104.

The opposite face of this piston 104 would be subjected to the pressure of the oil in the aforesaid space 58 for effecting engagement of the gear change clutch and in order under these circumstances to ensure that the direct drive clutch piston 104 can move into the engaged position when the gear change clutch piston 52 is itself subjected on its outer side to engaging oil pressure, the oil is fed to the outer side of the direct drive clutch piston 104 at a pressure somewhat higher than the pressure at which it is fed to the torque converter and from the latter to the space 58 on the outer side of the gear change clutch piston 52 as described in the first arrangement.

For this purpose as shown diagrammatically in Figure 16, between the supply pipe 66a from the oil pressure pump 46 and the inlet port 66 of the gear change clutch control valve, there is provided a high pressure reducing valve 110 in the form of a conventional spring loaded piston 110a adapted partially to cover port 66 so as thereby to supply the oil as already described to the torque converter at a somewhat lower pressure than to the direct drive clutch piston 104 which is subjected to full pump pressure. The inner end of the piston 110a is supplied through passage 110b with the oil at the pressure within port 66 so as to maintain a pressure difference between port 66 and port 117 predetermined by the loading of the piston spring 110c.

In such an arrangement the spring loaded piston 110a will assume a position of equilibrium when the pressure of the oil acting on the outer face of piston 110a (which is the pressure within port 117) is equal to the sum of the loading of spring 110c plus the pressure of the oil from port 66 supplied through passage 110b and acting on the inner face of piston 110a.

Since the area of the inner face of piston 110a including the area provided by the outer end of its illustrated skirt, will be equal to that of the outer end face, it follows that the piston 110a will reach a position of equilibrium in which it partially covers port 66 to an extent such that the pressure within port 66 (which is that of passage 110b) is less than the pressure within port 117 by an amount corresponding to the loading of the spring 110c, whereby the piston 110a provides the desired pressure reducing characteristics of this valve 110. In other words the oil flow into port 66 past the outer face of the piston 110a is throttled by the piston moving into the partially closed position aforementioned to provide the pressure reduction in port 66 corresponding to the maintenance of the piston in its aforesaid position of equilibrium.

The housing 64 of the valve member 65 is provided with clutch engaging and clutch disengaging ports 67, 68 in like manner to the construction depicted in Figures 1 to 8, and these are connected respectively by passages 111 and 112 formed in the adjacent part of the casing 41 to the annular space 48 around the turbine shaft 32 leading to the interior of the torque converter, and to axially extending passages 113 within the turbine shaft 32 communicating with the aforesaid gear change clutch disengaging space 50.

In this particular arrangement the two low pressure ports 69, 70 of the valve member housing 64 extend radially instead of axially as in the first described construction.

The valve means which is indicated generally at 114 for controlling the engagement and disengagement of the direct drive clutch, comprises a slidable valve member 115 working within a part 116 of valve housing 64 side-by-side with valve member 65 (see Figure 15), which housing part 116 has, as shown in Figure 16, three ports, namely, a high pressure supply port 117 in direct communication with supply pipe 66a, a direct drive clutch engaging port 118 connected directly to direct drive clutch engaging passage 108 aforementioned, and a low pressure discharge port 119 which communicates with the interior of casing 41.

The valve member 115 is provided with two axially spaced operative piston portions 120 and 121 working within housing part 116, the arrangement being such that with this valve member 115 in the position depicted in Figure 16, high pressure oil is supplied through port 118 to the oil receiving space 109 to displace direct drive clutch engaging piston 104 to the right in Figure 14 and effect engagement of the direct drive clutch. In the other position of this valve member 115 the piston portion 120 would be disposed between ports 117 and 118 in which position piston portion 121 would move beyond low pressure port 119 to place this in communication with clutch engaging port 118 and thereby relieve the oil pressure in the space 109 aforesaid and permit of piston 104 moving in a direction towards the fly-wheel 40 under the oil pressure within the space 58 adjacent the gear change piston 52.

The two valve members 65 and 115 would be coupled together in any convenient manner, for example, by operating them from mechanism similar to that depicted in Figures 3 and 4 in such a manner as to ensure that the valve member 115 can only be displaced into the direct drive clutch engaging position i. e. in an axially inward direction in Figure 15 after the valve member 65 has been displaced into the clutch engaged position thereby precluding engagement of the direct drive clutch except when the gear change clutch is also engaged, under which conditions the oil pressure within space 58 acting on direct drive clutch piston 104 will always be at a high pressure when disengagement of the direct drive clutch is required.

As in the case of the construction depicted in Figures 1 to 8 there is provided a pressure relieving valve indicated diagrammatically at 92 in Figure 16 and connected to passage 112 for the purpose of limiting the pressure within the space 50 adjacent the gear change clutch disc 59 and piston 52 for reasons above indicated.

With the arrangement described in Figures 14 to 16 it it is intended that the valve 114 controlling the operation of the direct drive clutch should be manually operated under the control of the vehicle driver, but if desired, such valve may be controlled by means of a known speed sensitive governor device, the arrangement being such that the direct drive clutch is engaged automatically on the attainment by the transmission of predetermined speed characteristics with corresponding similar automatic disengagement of such clutch. The provision of such automatic control avoids any possibility of the engine stalling in the event of the clutch being left engaged at too low an engine speed as might occur if the operation of this direct drive clutch is controlled manually.

Referring now to Figures 17 to 21 of the drawings there is here depicted a modified form of gear change clutch control valve applicable to the arrangement depicted in Figure 2 but embodying a hydraulic pressure operated clutch stop piston as depicted in Figure 9 wherein an alternative arrangement to the pressure relieving valve 92 of Figure 2 is employed for the purpose of avoiding possible distortion of the clutch piston 52 when the clutch is disengaged.

In this modified arrangement instead of reducing the pressure within the oil receiving space 50 below that obtaining within the torque converter and space 58 when the clutch is engaged, the pressure in the torque converter and space 58 is only partially relieved during the clutch disengaging operation instead of being completely relieved as in the arrangements hitherto described, so as to maintain a pressure difference during clutch disengagement between space 50 and 58 which may be of the relatively low order of 30 lbs. per square inch as in the case of the construction depicted in Figure 2, and this alternative arrangement has the advantage that it tends to maintain both spaces 50 and 58 together with the interior of the torque converted full of oil so as to permit of disengagement and also re-engagement of the clutch being effected in a particularly rapid manner.

For this purpose the housing 64 for gear change clutch valve member 65 has mounted therein as shown in Figures 19, 20 and 21 a pressure differential valve member 122 of piston form and mounted for sliding movement in a direction parallel to the direction of movement of valve member 65.

For this purpose the clutch engaging port 67 of valve member 65 communicates with the interior of housing part 123 of housing 64 in which part valve member 122 is axially slidable and this port 67 is disposed intermediate the two ends of housing part 123 to one end of which leads passage 67a which is connected to the annular space 48 surrounding the turbine shaft 32 and leading to the interior of the torque converter.

Adjacent the end of this passage 67a in communication with the adjacent interior of housing part 123 is clutch engaged port 124 at one end of pressure equalizing passage 125, the opposite end of which communicates through clutch disengaged port 126 with the interior of housing part 123 at a position intermediate the two ends of said part.

At the opposite end of this housing part 123 to passage 67a is an axially extending end port 127 communicating with clutch disengaging port 68 of valve member 65, which clutch disengaging port 68 is in communication with clutch disengaging space 50 through passage 68a.

The valve member 122 comprises a hollow piston 128 the end of which nearest to end port 127 is closed and the opposite end of which is formed as a hollow stem 129 of reduced diameter peripherally so that when the valve member 122 occupies the righthand position depicted in Figure 20, namely, the clutch engaged position, clutch engaging port 67 is in communication with passage 67a through the annular space within housing part 123 around the reduced stem portion 129.

As best shown in Figure 19, disposed within this hollow valve member 122 is a helically coiled compression spring 130, one end of which engages with the closed end of the piston 128 and the other end of which engages within threaded bush 131 in housing part 123, the hollow interior of which bush 131 is adapted to receive the adjacent end of the stem 129 when valve 122 is displaced to the fullest extent in a lefthand direction from the position depicted in Figures 19 and 21.

The mode of operation of this valve member 122 is as follows. When the valve member 65 is in the clutch engaged position depicted in Figure 20, the clutch disengaging port 68 and its associated passage 68a will be connected as already described in connection with Figures 6 to 8, through adjacent low pressure port 70 to the interior of casing 41 and end port 127 will also be at the low pressure i. e. atmospheric pressure of the casing, and consequently valve member 122 will be displaced to the fullest extent in the righthand direction in Figure 21 under the loading of spring 130 so that the closed end of this piston 122 abuts against the adjacent end wall of housing part 123, thus fully opening the communication between clutch engaging port 67 and passage 67a leading to the interior of the torque converter.

When however the valve member 65 is displaced by the operator to the right into the clutch disengaged position depicted in Figure 21 so as now to connect high pressure inlet port 66 to clutch disengaging port 68 in the manner already described in connection with Figures 6 to 8, port 127 will now be supplied with oil at pump pressure.

At the same time passage 67a and port 124 will both now be connected to the interior of the casing 41 at atmospheric pressure through port 67 and low pressure port 69 thereby initiating reduction in pressure within the torque converter and simultaneously opening port 124 to atmospheric pressure.

Thus the only force now resisting the full oil pressure at end port 127 on the adjacent end of piston 128 is that of spring 130 which is designed so as when fully extended in this position to exert a substantially less pressure than that of full pump pressure at port 127, and valve member 122 is accordingly displaced in a lefthand direction from Figure 20 so as to move into a position in which it closes port 67 and thus precludes further reduction of oil pressure within the torque converter while at the same time partially opening port 126 to place this in communication with port 127 in the manner depicted in Figure 21.

The external diameter of valve member stem 129 is less than the bore of hollow bush 131 so that even with the valve member 122 in the position depicted in Figure 21 in which the stem 129 extends within bush 131 the whole of the cross sectional area of piston 128 is subjected to the pressure of the oil in port 124. This means therefore that the pressure acting on valve member 122 tending to displace this in a righthand direction in Figure 21 is the sum of the oil pressure in port 124 together with the pressure exerted by spring 130, and the sum of these two pressures must be balanced by the pressure of the oil from end port 127 when the valve member 122 is in equilibrium. In other words, assuming as is necessary, that the spring 130 exerts an appreciable pressure tending to displace the valve 122 in a righthand direction it follows that the pressure in passage 125 and its associated ports 124 and 126 together with the pressure in passage 67a leading to the interior of the torque converter will always be less, with the valve member 122 in the position depicted in Figure 21, than the pressure in port 127 which is now that of the interior of the clutch disengaging oil space 50 and the valve member 122 will under these conditions continue to occupy a position as depicted in Figure 21 in which port 126 is partially open so as to provide a restricted pressure reducing leakage of oil at position 132 in Figure 21 from the oil in port 127 at full pump pressure to the oil in passages 125 and 67a at this reduced pressure.

It is accordingly ensured that the required relatively small oil pressure difference is maintained between the two clutch spaces 50 and 58 while maintaining space 58 together with the interior of the torque converter full of oil so as to facilitate rapid re-engagement of the clutch.

For a given working pressure within the torque converter this pressure difference can readily be predetermined by suitably designing the valve member 122 and its associated spring 130, and for instance with a delivery pressure from pump 46 of 75 lbs. per square inch with the valve member 122 in the position depicted in Figure 21 the pressure within passage 125 and the torque converter interior and oil space 58 may be maintained at the order of 60 lbs. per square inch, the difference in pressure being quite sufficient to ensure effective clutch disengagement.

In order to ensure that this predetermined pressure difference is always maintained, a relief valve 133 is incorporated in valve housing 64 in communication with inlet port 66 as shown in Figure 18, and set to relieve the pressure within this port and within port 127 in communication therewith at the predetermined maximum value, i. e. 75 lbs. per square inch in the aforesaid specific case.

The valve housing 64 is provided with a clutch stop port 94 operating as earlier described in connection with preceding Figures 9 to 13 and the valve member 65 is loaded by spring 75 as in the constructions earlier described.

Referring now to Figures 22 to 26 of the drawings there is here depicted a modification of the arrangement illustrated in Figure 14 incorporating a direct drive clutch for transmitting the drive direct from the driving member 31 to the gear box 34, which direct drive clutch is additional to the gear change clutch already described, and in this particular case embodies a driven clutch element 101 of disc-like construction similar in form to the disc-like driven clutch element 59 of the gear change clutch already described.

The engagement and disengagement of this direct drive clutch is under the automatic control of a governor indicated generally at 134, to be hereinafter more particularly referred to, responsive to the speed of output member 35 of gear box 34 and responsive also to engine torque as determined by the setting of the throttle control of the engine, which in this particular case would be a conventional internal combustion engine.

In this construction of Figures 22 to 26 the direct drive clutch serves to transmit a direct drive from the driving member 31 to the gear box 34 through the medium of direct drive shaft 135 which extends within hollow turbine shaft 32 so that the direct drive is transmitted through shaft 135 quite independently of the transmission of any drive through the gear change clutch.

For this purpose the direct drive clutch of the construction depicted in Figure 14 is modified to the extent of mounting the driven direct drive clutch element 101 slidably on splines 102 connecting it to the direct drive shaft 135, and the direct drive clutch piston 104 is mounted directly on the engine fly-wheel 104 to rotate therewith and is arranged to engage with the driven drive clutch element 101 in like manner to the clutch piston 52 of the gear change clutch shown in Figure 2 so as to displace this driven clutch element 101 into engagement with direct drive clutch driving element 136 mounted on the engine fly-wheel between driven clutch element 101 and the gear change clutch.

Engagement and disengagement of both of these clutches is effected hydraulically in manner generally similar to the arrangements previously described, although the particular form of valve means provided for controlling the operation of these two clutches is modified as hereinafter more particularly explained.

Before describing the arrangement of this valve means and its manner of operation, it will be convenient first to refer briefly to the gear box 34 and its associated governor 134.

The gear box 34 comprises an input member 33 formed as an integral extension of the turbine shaft 32 and having mounted thereon converter input pinion 137 adjacent to which is disposed a second input pinion 138 constituting a direct drive input pinion.

These input pinions 137, 138 mesh respectively with lay shaft input pinions 139, 140 arranged on gear box lay shaft 141. Pinion 140 is keyed to lay shaft 141 to rotate therewith, but a free wheel connection 142 is provided between input pinion 139 and the associated lay shaft arranged to permit of drive being transmitted from pinion 137 to lay shaft 141 for the normal direction of rotation of pinion 137 and its associated turbine shaft 32, while permitting of the lay shaft 141 over-running pinion 137 when a direct drive is transmitted to pinion 138.

The output member 35 of the gear box which is constructed as a shaft aligned with turbine shaft 32 and direct drive shaft 135 carries on its forward end nearest to the torque converter, a slidable clutch member 143 of conventional form, whereby this output shaft 35 can be clutched alternately to direct drive input pinion 138, or to an intermediate pinion 144 which is free on shaft 35 and meshes permanently with lay shaft pinion 145.

Clutch member 143 is operated manually by conventional gear shift lever 146 so as to provide a neutral position depicted in Figure 22 in which it is disengaged from both pinions 138 and 144 and also the high gear and intermediate gear positions in which it engages respectively with direct drive input pinion 138 and intermediate pinion 144.

Gear box output shaft 35 has slidably splined thereto, low gear pinion 147, which in one position, namely, a low gear position is adapted to mesh with lay shaft pinion 148 as shown in full outline in Figure 24, in a second position as depicted in Figures 22, 25 and 26 to be completely disengaged, and in a third or reverse position as depicted in dotted outline in Figure 24 to mesh with a reverse idler pinion 149 depicted in dotted outline in Figure 22 only, which reverse idler pinion is mounted in the conventional manner horizontally at one side of lay shaft 141 and meshes with reverse lay shaft pinion 150 on reverse lay shaft 151. This reverse shaft 151 carries pinion 152 which meshes permanently with the aforesaid lay shaft pinion 145.

The gear box 34 accordingly incorporates two shiftable elements, namely, gear box clutch element 143 and combined low gear and reverse pinion 147, each connected in the conventional manner through shift forks 153 and 154 respectively to the gear shift lever 146 so as to provide a high gear, an intermediate gear and a low gear, these being all forward gears, together with a reverse gear.

engagement of all of which gear positions would be effected manually from lever 146 with the aid of the gear change clutch aforementioned in the conventional manner.

With the foregoing described arrangement, low gear is obtained with the gear box clutch member 143 in the intermediate disengaged position depicted in Figure 22 and the low gear and reverse pinion 147 in the low gear position illustrated in full outline in Figure 24, while reverse gear is obtained with this pinion 147 in the reverse or dotted outline position depicted in this figure, leaving the gear box clutch member 143 in the same intermediate position.

Intermediate gear is obtained with the clutch member 143 in the position depicted in Figure 25 in which it connects gear box output shaft 35 to intermediate pinion 144, leaving low gear pinion 147 in the intermediate disengaged position depicted in Figure 25, while high gear is obtained with the low gear pinion 147 in this same intermediate disengaged position by clutching the gear box clutch member 143 to direct drive input pinion 138 in the manner illustrated in Figure 26.

In each of these four gear change positions of the gear box, the torque converter may be in full operation so as to provide full torque conversion, giving a low gear ratio position for each of these four gear box positions.

Further with reduction in torque transmitted through the torque converter, this will in the known manner function as a simple fluid coupling giving substantially 1:1 torque transmission therethrough so as to provide an intermediate gear ratio for each of these four gear box positions.

With both of the foregoing conditions of the torque converter, namely, low and intermediate gear ratio corresponding to full and nil torque conversion respectively, the direct drive clutch element 101 will be disengaged i. e. the power path will be through the torque converter but on the engagement of direct drive clutch element 101 under the control of the governor 134 in the manner hereinafter more particularly described, a high gear direct drive condition is imposed on each of the four gear box positions so that for each of these four gear box positions there are in fact three variations in gear ratio provided merely by the operation of the torque converter and direct drive clutch element 101, while in addition it will be appreciated that the change of gear ratio by the torque converter is in effect continuous between the position of full torque conversion and the condition upon which the torque converter functions purely as a fluid coupling.

Accordingly, for one particular design of torque converter and gear box in accordance with the accompanying drawing and as above described, there is set out below in table form the gear box speed ratio, and torque converter speed ratio, as well as the overall speed ratio of the transmission apparatus which can be achieved with the various conditions above set out, and in each of these tables has been included a column entitled "Power path legend" which shows the motation employed for the power path which has been depicted on Figures 24 to 26, of the drawing for each of the particular figures concerned.

TABLE A

*Gear box in low gear (Figure 24 of drawing)*

| Gear ratio as provided by torque converter and direct drive clutch | Gear box ratio | Torque Converter Ratio | Overall Ratio | Power path legend |
|---|---|---|---|---|
| Low | 7.57 to 1 | 2.1 to 1 | 15.9 to 1 | — — — — |
| Int | 7.57 to 1 | 1 to 1 | 7.57 to 1 | — — — |
| High | 5.00 to 1 | | 5.00 to 1 | —··—··—··— |

TABLE B

*Gear box in reverse gear (Figure 24 of drawing)*

| Gear ratio as provided by torque converter and direct drive clutch | Gear box ratio | Torque Converter Ratio | Overall Ratio | Power path legend |
|---|---|---|---|---|
| Low | 6.12 to 1 | 2.1 to 1 | 12.85 to 1 | —··—··— |
| Int | 6.12 to 1 | 1 to 1 | 6.12 to 1 | —··—··— |
| High | 4.04 to 1 | | 4.04 to 1 | ---------- |

TABLE C

*Gear box in intermediate gear (Figure 25 of drawing)*

| Gear ratio as provided by torque converter and direct drive clutch | Gear box ratio | Torque Converter Ratio | Overall Ratio | Power path legend |
|---|---|---|---|---|
| Low | 3.37 to 1 | 2.1 to 1 | 7.07 to 1 | — — — |
| Int | 3.37 to 1 | 1 to 1 | 3.37 to 1 | —·—·— |
| High | 2.22 to 1 | | 2.22 to 1 | —·—·—· |

TABLE D

*Gear box in high gear (Figure 26 of drawing)*

| Gear ratio as provided by torque converter and direct drive clutch | Gear box ratio | Torque Converter Ratio | Overall Ratio | Power path legend |
|---|---|---|---|---|
| Low | 1.51 to 1 | 2.1 to 1 | 3.17 to 1 | — — — — |
| Int | 1.51 to 1 | 1 to 1 | 1.51 to 1 | —·—·—·— |
| High | 1 to 1 | | 1 to 1 | —·—·—·—· |

The nature of the power paths as illustrated on Figures 24, 25 and 26 of the accompanying drawings will in conjunction with the foregoing description render perfectly clear the actual manner in which the power is transmitted through the two clutches of the transmission apparatus and through the gear box under the various conditions indicated.

From the foregoing tables it will be appreciated that it is possible to provide no less than nine different forward speed ratios and three different reverse ratios, while the two lowest forward and reverse ratios may be respectively substantially 16:1 and 13:1, thus providing a very low forward and reverse gear ratio rendering the transmission apparatus in this particular embodiment eminently suitable for very heavy duties, for example, on large goods carrying road vehicles.

From the foregoing, it will be appreciated that there is thereby provided a very wide variation of gear ratio arising from the fact that the gear box 34 is driven from two input members, namely, input pinion 137 and direct drive shaft 135 which two input members are driven respectively in accordance with the present invention through gear change clutch associated with the turbine element of the torque converter and direct drive clutch associated with the direct drive from the engine.

The manner in which the two clutches of this transmission apparatus are controlled including the control of the direct drive clutch by the governor 134 will now be explained. The governor 134 is driven direct from gear box lay shaft 141, or, alternatively, through an idle pinion 155 which meshes with pinion 156 (see Figure 23) on governor drive shaft 157, the governor which forms no part of the present invention being of the centrifugal weight type embodying pivotally mounted weights 158 which operate to displace governor slide 159 which engages with one side of one end of an actuating lever 160, which as shown in Figure 23 is pivoted intermediate its ends at 161 to stationary part 162 carried by the casing 41. This stationary part 162 provides a guide for a pair of opposed plungers 163 and 164 between which is disposed compression spring 165. One of these plungers 163 engages with the opposite side of the end of said actuating lever 160 to that which is engaged by governor slide 159, while the other of these plungers 164 is engaged on its outer end by the linkage 166 connected to the accelerator pedal 167 of the motor vehicle from which linkage would be taken also the usual connection to the engine fuel control not illustrated.

The opposite end of lever 160 engages with the operating stem 168 of solenoid control switch 169 which is in circuit with valve operated solenoid 170 (see Figure 22).

Referring again to Figure 23 the governor weights 158 are so arranged that when displaced outwardly under centrifugal force the slide 159 is displaced to the left in Figure 23 to pivot lever 160 in a direction to close switch 169, such closing movement of lever 160 being resisted by spring 165, the resistance of which increases with depression of accelerator pedal 167 tending to displace plunger 164 inwardly of guide 162.

Solenoid 170 when the circuit therethrough is closed by switch 169, is arranged to operate valve means for engaging the direct drive clutch, and from this it will be seen that provided that the depression of the accelerator pedal 167 is not undue corresponding to maximum fuel supply to the engine, increase in the speed of output member 35 for a given gear change position of box 34, will result in the governor closing switch 169 to engage the direct drive clutch, the switch opening or tending to be opened with reduction in speed of lay shaft 141 and also with increase in fuel supply to the engine to disengage the direct drive clutch in the manner now to be more particularly explained.

The armature 171 of solenoid 170 is connected to the slidably mounted valve member 115 of direct drive clutch valve 114, which valve is constructed in manner similar to the valve depicted at 114 in Figure 16 and again comprising high pressure supply port 117 in direct communication with supply pipe 66a from the pump 46 not illustrated in Figure 22, this valve 114 being provided similarly with direct drive clutch engaging port 118, which with the valve member 115 in the direct drive clutch disengaged position depicted in Figure 22 is in communication with low pressure discharge port 119.

Port 118 is connected to direct drive inlet port 172 of the housing 64 of the gear change clutch control valve means 62 which is similar to the valve means 62 described in Figures 5 to 8, but is in this instance provided with a high pressure port 173, a direct clutch engaging port 174 and a gear change clutch engaging port 175, which latter two ports are disposed intermediate the ends of the housing 64 which two ends are provided with low pressure ports 176 and 177.

Supply pipe 66a is provided with pressure reducing valve 178 connected to passage 48 leading to the interior of the torque converter 30 and to the gear change clutch space 58 as in the preceding constructions, the arrangement being such that the oil pressure within the torque converter is appreciably less than pump pressure by reason of this pressure reducing valve 178.

For the normal engaged position of the gear change clutch the valve member 65 of valve means 62 will be in the position illustrated in Figure 22 in which its two piston portions 71 and 72 are each on opposite sides of ports 172 and 174 with piston portion 72 closing high pressure port 173 and leaving gear change clutch engaging port 175 in communication with adjacent low pressure port 177. Under these conditions gear change clutch space 50 which as in the preceding constructions communicates through passages 113 and 74 with port 175 will be at atmospheric pressure, while high pressure oil space 109 associated with direct drive clutch piston 104 will through bore 106 and passage 107 leading to port 174 be also at atmospheric pressure by virtue of the communication of port 174 through port 172 with port 118 for the illustrated position of direct drive clutch valve member 115.

Under these conditions the space 179 containing direct drive clutch element 101 will be at torque converter pressure by virtue of its communication through passage 180 with space 58.

If under the operation of governor 134, valve member 115 is displaced from the torque conversion position illustrated in Figure 22 in a righthand direction into the direct drive position, its piston portion 121 will close the low pressure port 119 of valve means 114, placing port 117 in direct communication with port 118 so that assuming there has been no manual operation of valve member 65 oil at full pump pressure higher than that within space 179, will now be supplied to direct drive clutch engaging space 109, such supply being through ports 172, 174 and passages 107 and 106 thereby engaging direct drive from driving member 31 and fly-wheel 40 thereon to direct drive shaft 135 leading to the gear box 34.

If now for either position of direct drive clutch valve member 115 gear change clutch valve member 65 is manually slidden from the normal position illustrated in Figure 22 in a righthand direction into the gear change clutch disengaged position not illustrated in Figure 22, high pressure port 173 will now be in communication with gear change clutch engaging port 175 with port 172 closed by piston port 71 which moves past port 174 to place this in communication with adjacent low pressure port 176, thus completely relieving the pressure in space 109 and ensuring disengagement of direct drive clutch in the event of this having been engaged prior to this actuation of valve member 65.

Thus in this righthand position of valve member 65 oil at full pump pressure is admitted from port 173 through port 175 to clutch disengaging space 50 to disengage the gear change clutch in the manner earlier described Conveniently, valve member 65 is connected through a flexible cable control 181 to finger actuated trigger 182 mounted on manually operated gear shift lever 146 whereby the valve member may be readily shifted into the gear change clutch disengaged position each time the gear lever 146 is shifted. Such manual control of the gear change clutch is permitted by the fact that its engagement and disengagement is effected solely by the pressure of the oil.

When the direct drive clutch is engaged, a direct mechanical connection is provided between the vehicle engine and the output shaft 35 thus enabling over-run braking by the engine to be obtained, and manual means may be provided in the known manner to enable the direct drive clutch to be engaged for over-run braking purposes irrespective of its control by the speed responsive governor.

Although with each of the constructions described it might be considered that centrifugal force acting on the oil at the clutch disengaging side of each clutch disengaging piston might preclude satisfactory clutch engagement, for example, the centrifugal pressure developed on the oil adjacent the outer periphery of space 50. Experience has shown that in practice this clutch engaging pressure derived from the hydraulic circuit within the torque converter, including the pressure supplied thereto from the pump 46, is substantially greater than the clutch disengaging pressure arising from this centrifugal pressure within space 50 in the case of the gear change clutch, and the same applies also in the case of the direct drive clutch. Accordingly, this factor does not in any way prevent the satisfactory operation of the transmission apparatus as above described.

From the foregoing description it will be appreciated that the present invention enables a transmission apparatus of the kind specified to be provided with a disconnectable clutch in the drive to the output member such as member 35, namely, a gear change clutch specifically for the purpose of facilitating gear changes where the drive to the output member is through the medium of a change speed gear box, which apparatus may in the latter case be provided also with a direct drive clutch; which disconnectable drive clutch and also the direct drive clutch referred to where this is provided as well, are in the case of both clutches arranged in a particularly compact and convenient manner readily capable of being operated hydraulically; utilising the pressure of the hydraulic fluid within the transmission apparatus for that purpose, in a particularly simple manner as earlier described; and in particular with the disconnectable drive clutch, when this is in the engaged position utilizing the pressure developed within the hydraulic circuit formed by the impeller and turbine elements in maintaining the clutch in the engaged position, which is a very important and advantageous feature of this invention.

I claim.

1. Hydro-kinetic transmission apparatus for the purpose described, comprising rotatably mounted impeller and turbine elements forming a hydraulic circuit, said impeller element being adapted to circulate liquid under pressure around said hydraulic circuit, a rotatably mounted driven member adapted to be driven by said turbine element, a disengageable drive clutch comprising driving and driven clutch elements operably associated with the turbine element and driven member respectively, said clutch being adapted releasably to clutch the turbine element to the driven member, a displaceable clutch engaging piston, means for supplying the hydraulic liquid under pressure from said hydraulic circuit to one side of said piston to displace this in a direction for engaging the clutch, means for supplying hydraulic liquid under pressure to the opposite side of the piston to displace this in a direction to effect clutch disengagement, and valve means for controlling the difference in hydraulic pressure between said two opposite sides of said piston, and the arrangement being such that the clutch engaging pressure is obtained from the hydraulic pressure within the said hydraulic circuit.

2. Hydro-kinetic transmission apparatus for the purpose described, comprising rotatably mounted impeller and turbine elements forming a hydraulic circuit, said impeller element being adapted to circulate liquid under pressure around said hydraulic circuit, a rotatably mounted driven member adapted to be driven by said turbine element, a disengageable drive clutch comprising driving and driven clutch elements operably associated with the turbine element and driven member, and adapted releasably to clutch the turbine element to the driven member, a displaceable clutch engaging piston, means for supplying the hydraulic liquid under pressure from said hydraulic circuit to one side of said piston to displace this in a direction for engaging the clutch, means for supplying hydraulic liquid under pressure to the opposite side of the piston to displace this in a direction to effect clutch disengagement, valve means for supplying hydraulic liquid under pressure to said hydraulic circuit and for effecting relief of the pressure within said circuit, and valve means for controlling the supply of hydraulic liquid to said opposite side of said piston so as thereby to effect hydraulically actuated clutch engagement and disengagement, the arrangement being such that increase in hydraulic pressure within the hydraulic circuit and on the side first mentioned of said piston arising from the centrifugal forces acting on the rotating mass of hydraulic liquid results in an increase in clutch engaging pressure.

3. Hydro-kinetic transmission apparatus for the purpose described, comprising rotatably mounted impeller and turbine elements forming a hydraulic circuit, said impeller element being adapted to circulate liquid under pressure around said hydraulic circuit, a rotary driving member, a driving shell connecting said driving member to said impeller element, said shell forming a liquid containing enclosure in which is disposed said turbine element, said impeller and turbine elements being of annular form, a driven shaft extending through said annular impeller and turbine elements, a driven clutch element on said driven shaft to rotate therewith and extending within said driving shell, a driving clutch element on said turbine element adapted for clutch engagement with the adjacent side of said driven clutch element, a clutch engaging piston within said driving shell disposed between said driven clutch element and said driving member, said piston providing clutch engaging and clutch disengaging liquid-receiving spaces between it and the driving member and between it and the driven clutch element respectively, said apparatus embodying a communication between said hydraulic circuit and said clutch engaging space to feed hydraulic liquid under pressure thereto from said hydraulic circuit, means for feeding hydraulic liquid under pressure to said hydraulic circuit and also to said clutch disengaging space, and valve means for controlling the supply of hydraulic liquid under a predetermined pressure to the hydraulic circuit and to said clutch disengaging space so as to maintain under the control of the operator a pressure within said hydraulic circuit and clutch engaging space greater or less than that obtaining within the clutch disengaging space in such a manner as thereby to effect clutch engagement or disengagement.

4. Hydro-kinetic transmission apparatus for the purpose described, comprising a hydro-kinetic torque converter, said torque converter embodying vaned impeller, turbine and reaction elements, which three elements together form a hydraulic circuit, means mounting said impeller and turbine elements for rotational movement, said impeller element being adapted to circulate liquid under pressure around said hydraulic circuit, a rotatably mounted driving member, a driving shell providing a rigid rotatable driving connection between said driving member and the impeller element, said turbine element being disposed within said shell between the impeller element and the driving member, a thrust abutment on said driving member directed towards said impeller element and spaced axially therefrom beyond said turbine element, said impeller and turbine elements being of annular form, a driven shaft extending through said annular impeller and turbine elements, a driven clutch element on said driven shaft to rotate therewith, and displaceable axially of said shaft, said driven clutch element extending within said shell, a driving clutch element on the end of said turbine element nearest to the driving member and adapted for clutch engagement with said driven clutch element, a clutch engaging piston between said driven clutch element and said driving member, said piston being adapted on one side thereof nearest to the turbine element to engage with the driven clutch element and displace this into clutch engagement with the driving clutch element and on its opposite side to have axially directed thrust engagement with said thrust abutment on the driving member, said turbine element being displaceable in an axial direction away from said impeller element towards said driving member under the kinetic hydraulic thrust developed within said hydraulic circuit under operative torque transmitting conditions, means for supplying hydraulic liquid under pressure to the side of said piston nearest to the driven clutch element to effect clutch disengagement, and means for supplying hydraulic liquid under pressure from said hydraulic circuit to the side of said piston remote from said driven clutch element to effect clutch engagement, valve means for controlling said supply of hydraulic liquid under pressure to effect clutch engagement and disengagement, the arrangement being such that when the impeller and turbine elements are rotating under torque transmitting conditions and the clutch is engaged by said piston, the clutch engaging pressure applied to the piston is increased by the centrifugal forces acting on the hydraulic liquid in the hydraulic circuit and on the side of the piston subjected to clutch engaging hydraulic pressure and also by the displacement of the turbine element axially away from the impeller element under the said kinetic hydraulic thrust in the rotating hydraulic circuit, such displacement being by a distance sufficient to displace the driven clutch element together with the piston in engagement therewith to bring the piston into thrust engagement with said thrust abutment on the driving member to thereby increase the clutch engaging pressure.

5. Hydro-kinetic transmission apparatus for the purpose described, comprising, a rotatably mounted fly-wheel, a vaned impeller element mounted for rotation about the axis of rotation of said fly-wheel, means connecting said fly-wheel to the periphery of said impeller element, a vaned turbine element disposed between said fly-wheel and said impeller element, means supporting said turbine element for rotation co-axially with the axis of rotation of said impeller element, a vaned reaction element in association with said impeller and turbine elements forming a torque converter embodying a hydraulic circuit, said impeller element being adapted to circulate liquid under pressure around said hydraulic circuit, a rotatably mounted driven member extending through the centre of said impeller element adapted to be driven from said turbine element, a driving clutch element on said turbine element to rotate therewith, a driven disc-like clutch element on said driven member to rotate therewith, the periphery of which is adapted on one face of said disc-like driven clutch element for clutch releasable engagement with said turbine clutch element, a driven clutch element drivingly connected to said driven member and disposed between said turbine element and said fly-wheel, a disc-like clutch engaging piston disposed between said driven clutch element and said fly-wheel, said disc-like piston being adapted to apply clutch engaging pressure to the face of said driven disc-like clutch element remote from said turbine clutch element so that said driven disc-like clutch element extends between said piston and turbine element, said piston co-acting with said fly-wheel to provide a high pressure oil receiving space between said piston and said fly-wheel, said piston co-acting with said turbine element in providing a clutch disengaging oil receiving space, said apparatus having means providing a communication between said last-mentioned space and the interior of said torque converter so that the side of said piston remote from said driven clutch element is subjected to the hydraulic pressure obtaining within the torque converter to displace said piston in a direction to engage said clutch, and valve means adapted to control the difference in pressure of the hydraulic liquid within said two spaces in such a manner as to both increase and decrease the pressure in one of said two spaces in relation to the other of said two spaces for the purpose of displacing said piston in either of two opposite directions.

6. Hydro-kinetic transmission apparatus comprising rotatably mounted impeller and turbine elements forming a hydraulic circuit, said impeller element being adapted to circulate liquid under pressure around said hydraulic circuit, a rotatably mounted driving member, a driving shell providing a rigid rotatable driving connection between said driving member and the impeller element, said turbine element being disposed within said shell, between the impeller element and the driving member, a thrust abutment on said driving member directed towards said impeller element and spaced axially therefrom beyond said turbine element, said impeller and turbine elements being of annular form, a driven shaft extending through said annular impeller and turbine elements, a driven clutch element on said driven shaft to rotate therewith, and displaceable axially of said shaft, said driven clutch element extending within said shell, a driving clutch element on the end of said turbine element nearest to the driving member and adapted for clutch engagement with said driven clutch element, a clutch engaging piston between said driven clutch element and said driving member, said piston being adapted on one side thereof nearest to the turbine element to engage with the driven clutch element and displace this into clutch engagement with the driving clutch element and on its opposite side to have axially directed thrust engagement with said thrust abutment on the driving member, said turbine element being displaceable in an axial direction away from said impeller element towards said driving member under the kinetic hydraulic thrust developed within said hydraulic circuit under operative torque transmitting conditions, means for supplying hydraulic liquid under pressure to the side of said piston nearest to the driven clutch element to effect clutch disengagement, and means for supplying hydraulic liquid under pressure from said hydraulic circuit to the side of said piston remote from said driven clutch element to effect clutch engagement, valve means for controlling said supply of hydraulic liquid under pressure to effect clutch engagement and disengagement, the arrangement being such that when the impeller and turbine elements are rotating under torque transmitting conditions and the clutch is engaged by said piston, the clutch engaging pressure applied to the piston is increased by the centrifugal forces acting on the hydraulic liquid in the hydraulic circuit and on the side of the piston subjected to clutch engaging hydraulic pressure and also by the displacement of the turbine element axially away from the impeller element under the said kinetic hydraulic thrust in the rotating hydraulic circuit, such displacement being by a distance sufficient to displace the driven clutch element together with the piston in engagement therewith to bring the piston into thrust engagement with said thrust abutment on the driving member to thereby increase the clutch engaging pressure.

7. Hydro-kinetic transmission apparatus for the purpose described, comprising rotatably mounted impeller and turbine elements forming a hydraulic circuit, said impeller element being adapted to circulate liquid under pressure around said hydraulic circuit, a rotatably mounted driven member adapted to be driven by said turbine element, a drive disengaging clutch comprising driving and driven clutch elements operably associated with the turbine element and driven member respectively, said clutch being adapted releasably to clutch the turbine element to the driven member, a displaceable clutch engaging piston, means for supplying the hydraulic liquid under pressure from said hydraulic circuit to one side of said piston to displace this in a direction for engaging the clutch, means for supplying hydraulic liquid under pressure to the opposite sides of the piston to displace this in a direction to effect clutch disengagement, valve means for controlling the difference in hydraulic pressure between said two opposite sides of said piston, said valve means comprising a slidable valve member, a housing for said valve member, said valve member having a pair of axially spaced piston portions, said valve housing having intermediate its two ends a high pressure inlet port and adjacent each of its two ends a low pressure discharge port, said valve housing having a clutch engaging and a clutch disengaging port disposed between said inlet port and one or other of said low pressure discharge ports respectively with means connecting said clutch engaging and clutch disengaging ports to the hydraulic circuit at the one side of said piston and to the opposite side of said piston respectively and means for supplying hydraulic liquid under pressure to said high pressure inlet port, said piston portions being spaced relatively apart by a distance greater than the spacing between the inlet port and the clutch engaging and disengaging ports, and the arrangement being such that with the valve member in both the clutch engaged and disengaged position the pressure from the inlet port acts substantially equally in opposite directions of each of the two piston portions.

8. Hydro-kinetic transmission apparatus for vehicles, comprising rotatably mounted impeller and turbine elements forming a hydraulic circuit, said impeller element being adapted to circulate liquid under pressure around said hydraulic circuit, a rotatably mounted driven member adapted to be driven by said turbine element and to transmit drive from the turbine element to a change speed gear box, a gear change clutch comprising driving and driven clutch elements operably associated with the turbine element and driven member respectively, said clutch being adapted releasably to clutch the turbine element to the driven member, a displaceable clutch engaging piston, means for supplying the hydraulic liquid under pressure from said hydraulic circuit to one side of said piston to displace this in a direction for engaging the clutch, means for supplying hydraulic liquid under pressure to the opposite side of the piston to displace this in a direction to effect clutch disengagement, valve means for controlling the difference in hydraulic pressure between said two opposite sides of said piston, and mechanical means for operating said valve means, a clutch stop element on said driven member to rotate therewith, a slidably mounted plunger adapted for braking engagement with said clutch stop element, and said mechanical means being adapted to displace said clutch stop plunger to engage with said clutch stop element after said valve means have been fully operated to effect full clutch disengagement.

9. Hydro-kinetic transmission apparatus for vehicles, comprising rotatably mounted impeller and turbine elements forming a hydraulic circuit, said impeller element being adapted to circulate liquid under pressure around said hydraulic circuit, a rotatably mounted driven member adapted to be driven by said turbine element and to transmit drive from the turbine element to a change speed gear box, a gear change clutch comprising driving and driven clutch elements operably associated with the turbine element and driven member respectively, said clutch being adapted releasably to clutch the turbine element to the driven member, a displaceable clutch engaging piston, means for supplying hydraulic liquid under pressure from said hydraulic circuit to one side of said piston to displace this in a direction for engaging the clutch, means for supplying hydraulic liquid under pressure to the opposite side of the piston to displace this in a direction to effect clutch disengagement, valve means for controlling the difference in hydraulic pressure between said two opposite sides of said piston, and said valve means comprising a valve member displaceable in one direction from a clutch engaging to a clutch disengaging position and in the opposite direction from a clutch disengaging to a clutch engaging position, a clutch stop element on said driven member to rotate therewith, a hydraulically operated displaceable clutch stop piston adapted to be displaced in one direction to apply braking pressure to said clutch stop element, and said valve member being adapted when displaced through a predetermined distance beyond said clutch disengaging position to effect hydraulic pressure displacement of said clutch stop piston to brake said clutch stop element.

10. Hydro-kinetic transmission apparatus for vehicles for the purpose described, comprising rotatably mounted impeller and turbine elements forming a hydraulic circuit, said impeller element being adapted to circulate liquid under pressure around said hydraulic circuit, a rotatably mounted driven member adapted to be driven by said turbine element and to transmit drive from the turbine element to a change speed gear box, a gear change clutch comprising driving and driven clutch elements operably associated with the turbine element and driven member respectively, said clutch being adapted releasably to clutch the turbine element to the driven member, a displaceable clutch engaging piston, means for supplying the hydraulic liquid under pressure from said hydraulic circuit to one side of said piston to displace this in a direction for engaging the clutch, means for supplying hydraulic liquid under pressure to the opposite side of the piston to displace this in a direction to effect clutch disengagement, valve means for controlling the difference in hydraulic pressure between said two opposite sides of said piston, a clutch stop element on said driven member to rotate therewith, a hydraulically operated displaceable clutch stop piston adapted to be displaced in one direction to apply braking pressure to said clutch stop element, said valve means comprising a slidable valve member, a housing for said valve member, said valve member having a pair of axially spaced piston portions, said valve housing having intermediate its two ends a high pressure inlet port and adjacent each of its two ends a low pressure discharge port, said valve housing having a clutch engaging and a clutch disengaging port disposed between said inlet port and one or other of said low pressure discharge ports respectively with means connecting said clutch engaging and clutch disengaging ports to the hydraulic circuit at the one side of said piston and to the opposite side of said piston respectively, means for supplying hydraulic liquid under pressure to said high pressure inlet port, said valve member housing having a clutch stop port with means connecting said clutch stop port to said displaceable clutch stop piston to effect operative displacement thereof, and said valve member when displaced through a predetermined distance beyond said clutch disengaged position being adapted to open said clutch stop port to said inlet port to supply hydraulic liquid under pressure to said clutch stop piston and brake said clutch stop element.

11. Hydro-kinetic transmission apparatus for the purpose described, comprising rotatably mounted impeller and turbine elements forming a hydraulic circuit, said impeller element being adapted to circulate liquid under pressure around said hydraulic circuit, a rotatably mounted driven member adapted to be driven by said turbine element, a drive disengaging clutch comprising driving and driven clutch elements operably associated with the turbine element and driven member respectively, said clutch being adapted releasably to clutch the turbine element to the driven member, a displaceable clutch engaging piston, means for supplying the hydraulic liquid under pressure from said hydraulic circuit to one side of said piston to displace this in a direction for engaging the clutch, means for supplying hydraulic liquid under pressure to the opposite side of the piston to displace this in a direction to effect clutch disengagement, pressure relieving valve means operably connected to said opposite side of said piston and adapted to maintain a maximum hydraulic pressure on said opposite side of said piston less than operative pressure within said hydraulic circuit, clutch control valve means for controlling the difference in hydraulic pressure between said two opposite sides of said piston to effect operative displacement of said piston, and the arrangement being such that the clutch engaging pressure is obtained from the hydraulic pressure within the said hydraulic circuit.

12. Hydro-kinetic transmission apparatus for the purpose described, comprising rotatably mounted impeller and turbine elements forming a hydraulic circuit, said impeller element being adapted to circulate liquid under pressure around said hydraulic circuit, a rotatably mounted driven member adapted to be driven by said turbine element, a drive disengaging clutch comprising driving and driven clutch elements operably associated with the turbine element and driven member respectively, said clutch being adapted releasably to clutch the turbine element to the driven member, a displaceable clutch engaging piston, means for supplying the hydraulic liquid under pressure from said hydraulic circuit to one side of said piston to displace this in a direction for engaging the clutch, means for supplying hydraulic liquid under pressure to the opposite sides of the piston to displace this in a direction to effect clutch disengagement, valve means for controlling the difference in hydraulic pressure between said two opposite sides of said piston, and a pressure balancing valve adapted to effect partial relief of the hydraulic circuit pressure when said valve means are operated to displace said piston in a direction to effect disengagement of said clutch.

13. Apparatus according to claim 3 wherein a pressure balancing valve is provided adapted to effect partial relief of the hydraulic circuit pressure when said valve means are operated to displace said piston in a direction to effect disengagement of said clutch.

14. Apparatus according to claim 7, wherein the clutch engaging and clutch disengaging ports are connected to opposite sides of a spring loaded piston, a by-pass passage in association with said piston the effective cross-sectional area of which is adapted to be controlled by said piston, the arrangement being such that a pressure difference is thereby provided between the said clutch engaging and clutch disengaging ports connected to opposite sides of said clutch engaging piston.

15. Hydro-kinetic transmission apparatus for vehicles for the purpose described, comprising rotatably mounted impeller and turbine elements forming a hydraulic circuit, said impeller element being adapted to circulate liquid under pressure around said hydraulic circuit, a rotatably mounted driven member adapted to be driven by said turbine element and to transmit drive from the turbine element to a change speed gear box, a gear change clutch comprising driving and driven clutch elements operably associated with the turbine element and driven member respectively, said clutch being adapted releasably to clutch the turbine element to the driven member, a displaceable clutch engaging piston, means for supplying the hydraulic liquid under pressure from said hydraulic circuit to one side of said piston to displace this in a direction for engaging the clutch, means for supplying hydraulic liquid under pressure to the opposite side of the piston to displace this in a direction to effect clutch disengagement, valve means for controlling the difference in hydraulic pressure between said two opposite sides of said piston, a 1:1 direct driving clutch between said impeller element and said driven member, and valve controlled hydraulically operated means for effecting engagement and disengagement of said direct drive clutch.

16. Apparatus according to claim 15 wherein said direct drive clutch is arranged adjacent the periphery of said gear change clutch, the arrangement being such that when the direct drive clutch is engaged the drive is transmitted from said direct drive clutch to the driven member through the medium of the gear change clutch.

17. Apparatus according to claim 3 including a 1:1 direct drive clutch arranged within the interior of said driving shell, said direct drive clutch comprising a driving clutch element operably connected to the shell, a driven clutch element operably connected to the driven member, a direct drive clutch engaging piston adapted to clutch said driving and driven direct drive clutch elements together, means for supplying hydraulic liquid under pressure to each of two opposite sides of said direct drive clutch engaging piston to displace this in a direction for engaging or disengaging said direct drive clutch, and direct drive clutch operating valve means for controlling the displacement of said direct drive clutch engaging piston.

18. In hydro-kinetic transmission apparatus and embodying a torque converter comprising impeller turbine and a reaction element in combination with a lay shaft type gear box having a plurality of input members one of which is adapted to be driven from the turbine element with a speed responsive governor controlled clutch for connecting the impeller element directly to another input member of the change speed gear box, said apparatus being characterised by the provision of a gear change clutch adapted to provide a disengageable drive between the turbine element and said associated input member of the gear box, said gear change clutch comprising a driven clutch element drivingly connected to the input member and adapted for releasable clutch driving connection with the turbine element, means for supplying the hydraulic liquid under pressure from said hydraulic circuit to one side of said piston to displace this in a direction for engaging the gear change clutch, means for supplying hydraulic liquid under pressure to the opposite side of the piston to displace this in a direction to effect gear change clutch disengagement, valve means for controlling the difference in hydraulic pressure between said two opposite sides of said piston, and the arrangement being such that increase of hydraulic pressure within the hydraulic circuit of the transmission apparatus results in an increase in the gear change clutch engaging pressure applied from said hydraulic circuit to said one side of the gear change clutch engaging piston acting in a direction for engaging the gear change clutch.

19. Apparatus according to claim 18 including valve means for effecting hydraulic operation of said governor controlled clutch with means for operating said valve means from said governor, said valve means for controlling the operation of said gear change clutch being manually operable and adapted to provide an overriding control for both of said clutches, the arrangement being such that when said gear change clutch means are operated to effect disengagement of said gear change clutch, said governor control clutch is also disengaged.

20. Transmission apparatus for vehicles and according to claim 1 characterised by the provision of a lay shaft gear box having an output member for transmitting drive to the vehicle, such gear box including two input pinions and being adapted to provide a multiplicity of gear ratios to its output member, one of said input pinions being connected through said driven member to the turbine element of the transmission apparatus through said disengageable drive clutch, the other of said input pinions being connected to a second driven member, which second driven member is connected to the driving member of the transmission apparatus through the medium of a hydraulically operated direct drive clutch, the hydraulic operation of which is under the control of a speed responsive governor, the arrangement being such as to provide a multiplicity of gear ratios either in a direct drive from the driving member to the output member of the gear box, or through the hydraulic circuit from the impeller element to the turbine element, and through the direct drive clutch and gear change clutch respectively.

References Cited in the file of this patent

UNITED STATES PATENTS

| | | |
|---|---|---|
| 2,529,400 | Lapsley | Nov. 7, 1950 |
| 2,627,189 | McFarland | Feb. 3, 1953 |
| 2,726,556 | Greenlee | Dec. 13, 1955 |